United States Patent  (10) Patent No.: US 12,512,346 B2
Reed et al.  (45) Date of Patent: Dec. 30, 2025

(54) SCATTER MELT DETECTION TO DETERMINE PHASE TRANSITION OF SEMICONDUCTOR DURING LASER ANNEALING

(71) Applicant: Veeco Instruments Inc., Plainview, NY (US)

(72) Inventors: Matthew Earl Wallace Reed, San Jose, CA (US); Xiaohua Shen, Fremont, CA (US)

(73) Assignee: Veeco Instruments Inc., Plainview, NY (US)

( * ) Notice: Subject to any disclaimer, the term of this patent is extended or adjusted under 35 U.S.C. 154(b) by 330 days.

(21) Appl. No.: 18/297,745

(22) Filed: Apr. 10, 2023

(65) Prior Publication Data

US 2023/0360937 A1  Nov. 9, 2023

Related U.S. Application Data

(60) Provisional application No. 63/337,714, filed on May 3, 2022.

(51) Int. Cl.
*H01L 21/67* (2006.01)
*B23K 26/354* (2014.01)
*G02B 21/00* (2006.01)
*G06T 7/00* (2017.01)
*H01L 21/268* (2006.01)

(52) U.S. Cl.
CPC ...... *H01L 21/67253* (2013.01); *B23K 26/354* (2015.10); *G02B 21/0028* (2013.01); *G02B 21/0052* (2013.01); *G02B 21/008* (2013.01); *G06T 7/001* (2013.01); *H01L 21/268* (2013.01); *G06T 2207/10056* (2013.01); *G06T 2207/30148* (2013.01)

(58) Field of Classification Search
CPC ..... G06T 7/0002; G06T 7/0004; G06T 7/001; G06T 2207/10056; G06T 2207/30108; G06T 2207/30148; H01L 21/268; H01L 21/67253; G02B 21/0028; G02B 21/0052; G02B 21/008; B23K 26/0006; B23K 26/032; B23K 26/352; B23K 26/354; B23K 2101/36; B23K 2101/40
See application file for complete search history.

(56) References Cited

U.S. PATENT DOCUMENTS 9,559,023 B2 *  1/2017  McWhirter ........... H01L 21/324
10,209,203 B2 *  2/2019  Fujikura .............. G01N 21/956
(Continued)

FOREIGN PATENT DOCUMENTS

KR  1020120060162 A  6/2012
TW      1737004 B1 *  8/2021

OTHER PUBLICATIONS

Qiao, J., "Laser annealing on wafer" (Doctoral dissertation, Politecnico di Torino) (Year: 2021).*

(Continued)

*Primary Examiner* — Scott A Rogers
(74) *Attorney, Agent, or Firm* — Downs Rachlin Martin PLLC

(57) ABSTRACT

High bandwidth time-and-space resolved scatter phase transition microscopy systems configured to detect melt onset in a wafer being processed by laser annealing systems with ultra-short dwell times and spot size.

21 Claims, 14 Drawing Sheets

(56) References Cited

U.S. PATENT DOCUMENTS

| | | | |
|---|---|---|---|
| 10,290,502 B2 | 5/2019 | Wang et al. | |
| 10,847,381 B2* | 11/2020 | Hawryluk | H01L 21/67248 |
| 11,158,510 B2* | 10/2021 | Lee | G01N 21/25 |
| 11,417,551 B2* | 8/2022 | Reed | G02B 21/0016 |
| 12,109,648 B2* | 10/2024 | Tanaka | B23K 26/0676 |
| 2005/0078298 A1 | 4/2005 | Takami | |
| 2013/0196455 A1* | 8/2013 | Shen | B23K 26/0608 |
| | | | 257/E21.333 |
| 2021/0013070 A1 | 1/2021 | Reed | |
| 2021/0287921 A1 | 9/2021 | Tanaka | |
| 2023/0268233 A1* | 8/2023 | Kumar | H01L 21/324 |
| | | | 438/14 |

OTHER PUBLICATIONS

PCT International Search Report and Written Opinion dated Jul. 7, 2023 in International Patent Application No. PCT/US2023/016071 to Veeco Instruments Inc.

* cited by examiner

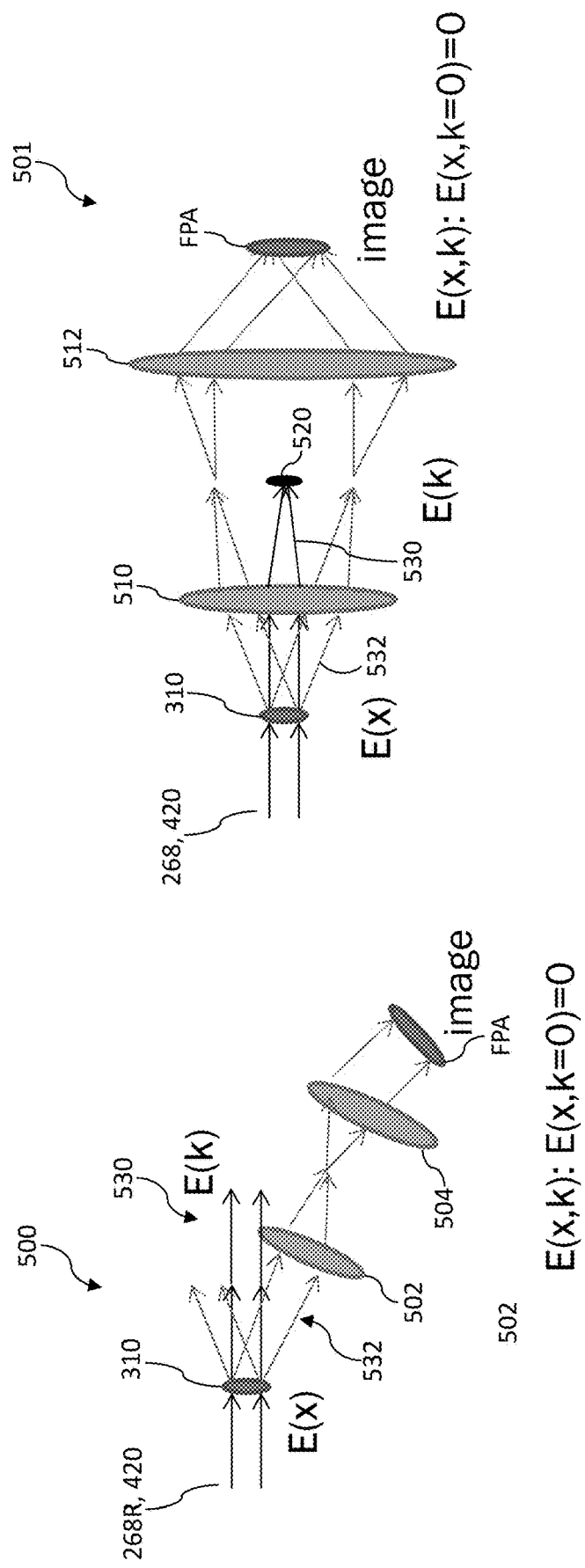

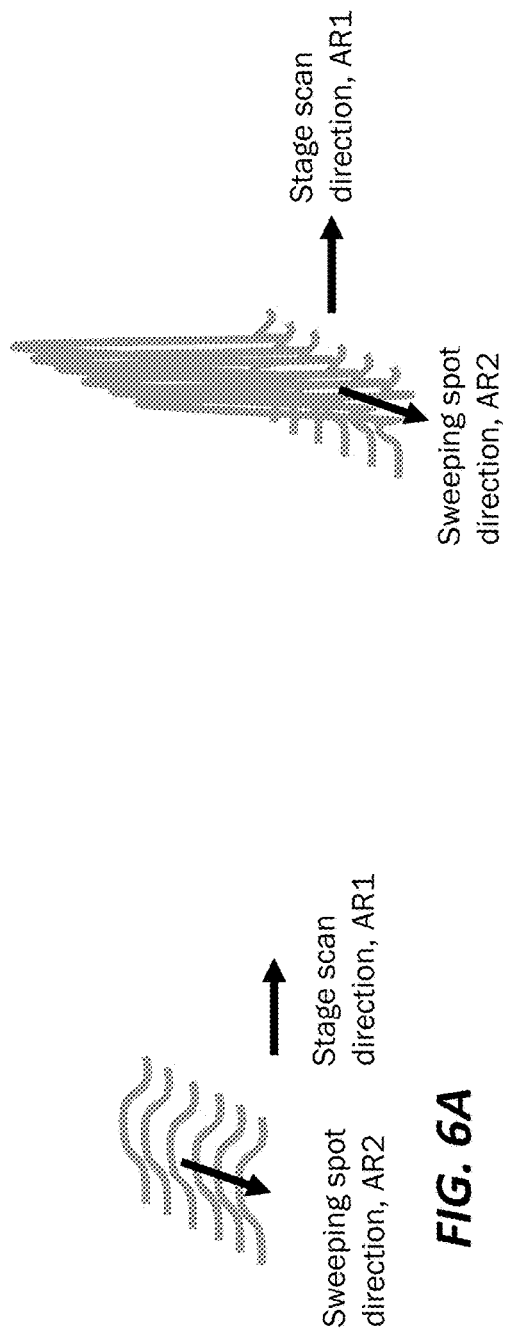
FIG. 6A
FIG. 6B
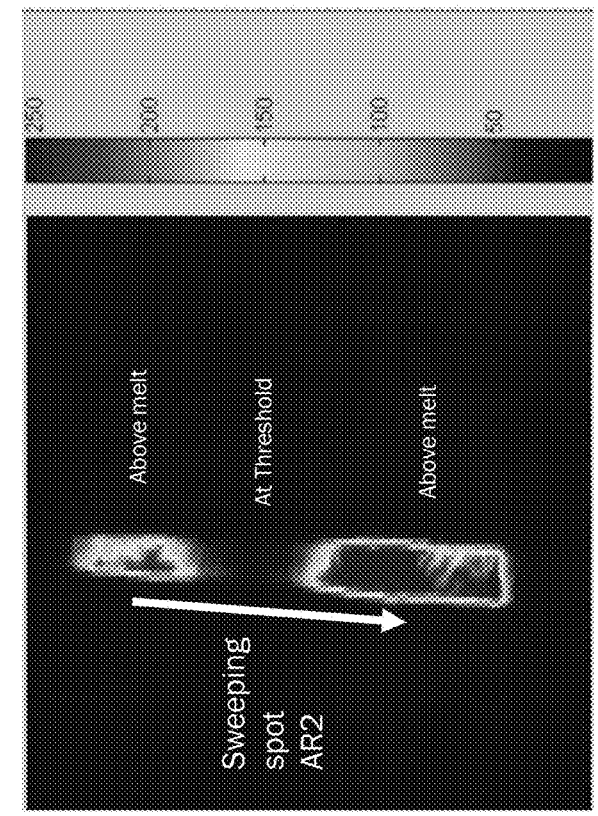
FIG. 6C

SCATTER MELT DETECTION TO DETERMINE PHASE TRANSITION OF SEMICONDUCTOR DURING LASER ANNEALING

RELATED APPLICATION DATA

This application claims the benefit of priority of U.S. Provisional Patent Application Ser. No. 63/337,714, filed on May 3, 2022, and titled "Scatter Melt Detection Systems and Methods of Using the Same," which is incorporated by reference herein in its entirety.

FIELD OF THE DISCLOSURE

The present disclosure relates generally to thermometry, and in particular relates to phase transition microscopy.

BACKGROUND

Pulsed-laser melt annealing systems are utilized in advanced integrated circuit (IC) chip fabrication for rapid thermal processing of the chips. The heat treatments provided by such laser systems can be used for various effects, such as dopant activation, defining junctions, and otherwise changing material and electrical properties of the chip. Accurate measurement and control of wafer temperature during annealing with pulsed-laser systems, however, is important and can be challenging as the time duration over which the laser raises the wafer temperature to a melt temperature and the surface area of the wafer over which the laser acts decrease. Accurate measurement and control of wafer temperature is also important for annealing system calibration.

SUMMARY OF THE DISCLOSURE

In one implementation, the present disclosure is directed to a method of determining the occurrence of a solid to liquid material phase transition of a semiconductor material during a laser annealing process. The method includes forming an annealing image on a surface of the semiconductor material with an annealing laser beam from an annealing laser; forming a scatter image of a region of the semiconductor surface that includes the annealing image; and identifying a solid to liquid material phase transition of the semiconductor material according to an intensity of light collected in the scatter image.

In another implementation, the present disclosure is directed to a method of analyzing scatter image data, which includes receiving a scatter image of a region of a semiconductor surface captured during a laser annealing process of the semiconductor; and identifying a solid to liquid material phase transition of the semiconductor material from the image; wherein the identifying includes an identification of a statistical, time-series, or geometric non-linear variation of image intensity as a function of one or more annealing process control parameters.

In yet another implementation, the present disclosure is directed to a method of performing a melt calibration for a laser annealing process for a semiconductor material. The method includes annealing a region of the semiconductor material with an annealing laser beam from an annealing laser, wherein the annealing includes incrementally varying a power level of the annealing laser below and above a melt threshold power level where a solid to liquid phase transition of the semiconductor material occurs; capturing scatter images of the region of the semiconductor material during the annealing; and determining at least one melt threshold setpoint power level for the annealing laser from the captured scatter images.

In yet another implementation, the present disclosure is directed to a scatter melt detection system, which includes a stage configured to support a semiconductor wafer; an annealing laser configured to anneal the semiconductor wafer; and a scatter melt detector that includes an image capture device that includes a focal plane array (FPA); and a scatter optical arrangement configured to block or avoid a specular reflection of a beam formed by the annealing laser and form a scatter image of a surface of the semiconductor wafer on the FPA.

In yet another implementation, the present disclosure is directed to a laser annealing system, which includes an annealing laser; a storage device containing at least one annealing laser melt threshold calibration setpoint that specifies an operating parameter of the annealing laser to raise a temperature of a local region of a semiconductor material to a melt threshold under a set of predetermined annealing process conditions, wherein the calibration setpoint was derived from scatter images of the semiconductor material taken during a laser annealing process of the semiconductor material; and a controller configured to control the annealing laser according to the annealing laser melt threshold calibration setpoint.

In yet another implementation, the present disclosure is directed to a non-transitory machine readable storage medium, which includes at least one annealing laser melt threshold calibration setpoint that specifies an operating parameter of an annealing laser to raise a temperature of a local region of a semiconductor material to a melt threshold under a set of predetermined annealing process conditions, wherein the calibration was derived from scatter images of the semiconductor material taken during a laser annealing process of the semiconductor material.

In yet another implementation, the present disclosure is directed to a method of forming below-melt reference images and parameters for use with a melt-detection algorithm. The method includes annealing a wafer below melt; capturing image frames with a scatter melt detector; recording an annealing laser power level; creating a below-melt reference image from the captured image frames; processing the below-melt reference image to generate a plurality of below-melt one-dimensional stage scan direction intensity profiles; identifying a region of interest (ROIref) of the below-melt reference image; and creating an average one-dimensional stage scan direction intensity profile.

In yet another implementation, the present disclosure is directed to a method of detecting whether a wafer material melted during an annealing process. The method includes annealing a wafer below, at, or above a melt threshold, capturing image frames with a scatter melt detector during the annealing, and recording the laser power levels; creating an averaged image from the captured image frames; and creating a melt-detection image that references the averaged image to a corresponding below-melt reference image for the same wafer type.

In yet another implementation, the present disclosure is directed to a method of detecting whether a wafer material melted during an annealing process. The method includes annealing a wafer below, at, or above a melt threshold, and capturing image frames during the annealing with a scatter melt detector; calculating a statistical variation of pixel values within a region of interest, ROIref, of the image frames, wherein ROIref is a region of the image where an annealing laser image was formed on the wafer; and comparing the calculated statistical variation to identify the onset of melt.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIG. 5A is a schematic diagram of an optical arrangement of a scatter imaging system of the present disclosure;

FIG. 5B is a schematic diagram of another example of an optical arrangement of a scatter imaging system of the present disclosure;

FIG. 6A conceptually and graphically illustrates data captured in an image frame by an image capture device of a scatter melt detector during a sweep of an annealing image when a wafer surface is below melt;

FIG. 6B conceptually and graphically illustrates data captured in an image frame by an image capture device of a scatter melt detector during a sweep of an annealing image when a wafer surface is above melt and pools of liquid phase material formed along the sweep of the annealing image;

FIG. 6C illustrates data from an image frame of a sweep of an annealing image by an annealing laser that is not properly calibrated resulting in portions of the sweep being below and above melt;

DETAILED DESCRIPTION

Aspects of the present disclosure include high bandwidth time-and-space resolved phase transition microscopy systems configured to detect the onset of melt in a semiconductor wafer being processed by scanning CW or QCW (pulse time<<dwell time) laser annealing systems with ultra-short dwell times and small spot size and for calibration of such systems for annealing processes. In some examples, melt detection systems of the present disclosure are configured to accurately and reliably detect melt onset for lasers with ultra-short dwell times in the range from 10 ns to 500 ns or 25 ns to 250 ns and spot sizes in the range of 10 um-150 um×10 um-150 um.

Melt annealing includes locally raising the temperature of a wafer surface or subsurface with an incident laser beam until it melts. In an example wherein the wafer surface is constituted by a thin layer of silicon overlying a layer of material with a lower melt temperature (e.g., germanium or germanium-silicon), the wafer surface may remain solid while the subsurface material melts. Melt detection systems described herein may be configured to detect melt in a surface melt process, where melt occurs on the wafer surface and/or may be configured to detect melt in a subsurface melt process, where the wafer surface remains solid and a volume of material beneath the wafer surface melts.

Figure 1:
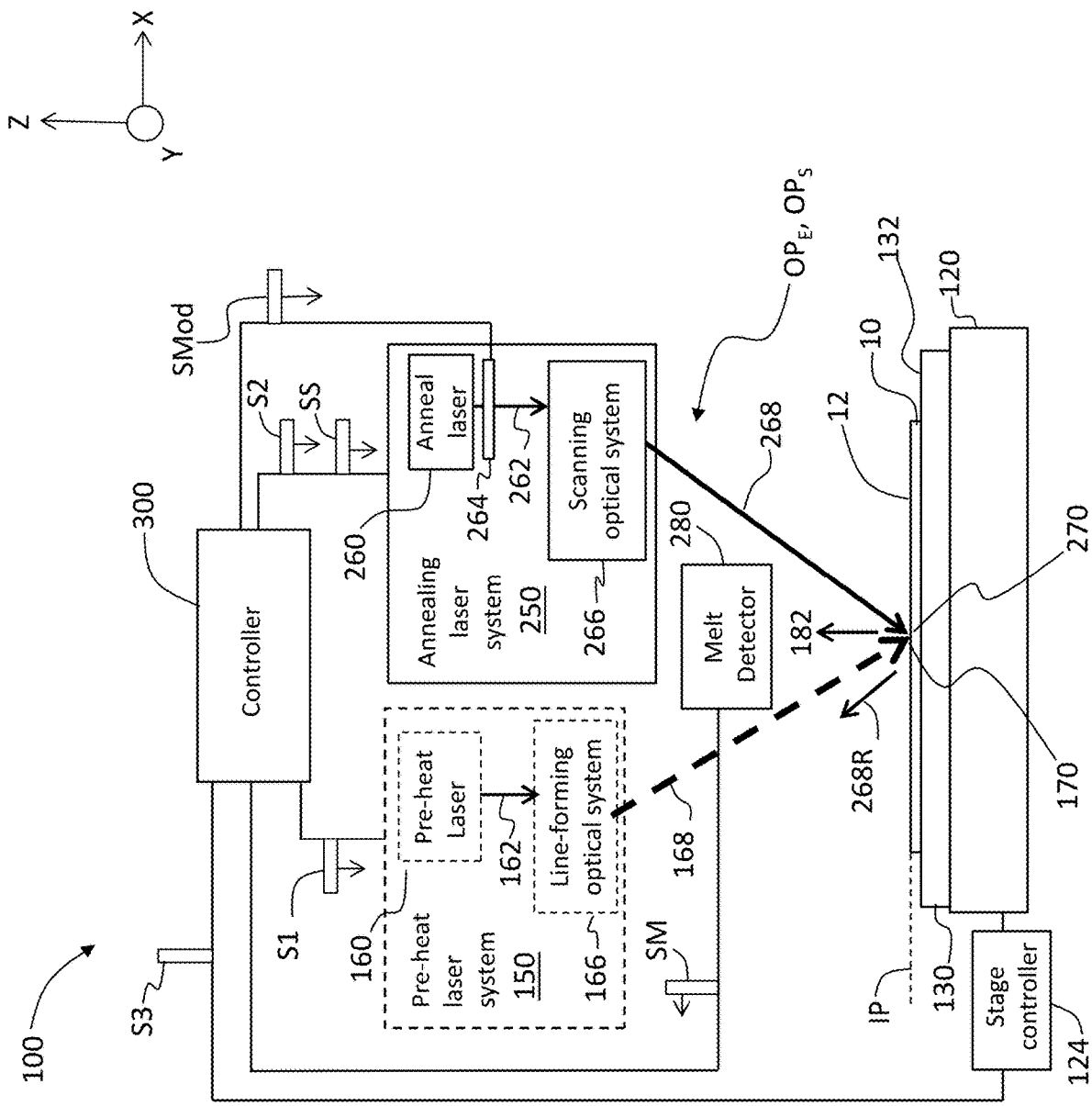
FIG. 1 is a schematic diagram of an example laser annealing system with a scatter melt detector according to the disclosure.

FIG. 1 is a schematic diagram of an example quasi continuous wave (QCW) laser annealing system ("system") 100 that may incorporate melt detection systems of the present disclosure. As will be appreciated, system 100 is described and illustrated by way of example and melt detection systems of the present disclosure may be used on any of a variety of other laser annealing systems. Certain aspects of example embodiments of system 100 are described in U.S. Pat. No. 10,083,843, titled, Laser Annealing Systems And Methods With Ultra-Short Dwell Times, and issued on Sep. 25, 2018, the contents of which are incorporated by reference herein in its entirety. The references incorporated in U.S. Pat. No. 10,083,843 are also incorporated by reference herein in their entireties, including, U.S. Pat. Nos. 8,309,474; 8,546,805; 8,865,603; and U.S. patent application Ser. No. 14/497,006, now issued as U.S. Pat. No. 9,343,307.

System 100 includes a wafer stage 120 that operably supports a chuck 130 having an upper surface 132. Wafer stage 120 is operably connected to a stage controller 124 and is configured to move in the X-Y plane and optionally in the Z-direction via the operation of the stage controller. Chuck upper surface 132 is configured to operably support a wafer 10 having a surface 12. In some examples wafer 10 may be processed and include a pattern defined by semiconductor structures typically associated with the various stages of fabricating integrated circuit chips, in many cases optically deep, highly patterned, many-layered structures. In other examples wafer 10 may be unprocessed without manufactured structures and surface 12 may be an extremely smooth mirror-like surface. As described more below, an unprocessed wafer 10 may be useful with the metrology systems disclosed herein for calibrating and tracking the performance of a laser annealing tool. The metrology systems disclosed herein can also be utilized with a well calibrated annealing system to perform wafer-specific annealing laser power calibrations to determine, e.g., melt threshold setpoint power levels for unique materials and surfaces. In an example, chuck 130 includes a heater that heats wafer 10 to a uniform above-ambient temperature. Wafer stage 120 is operably connected to stage controller 124.

System 100 includes an annealing laser system 250 configured to generate a scanning laser beam 268 that forms an annealing image 270 (FIG. 2) on the wafer surface 12. The annealing laser system 250 includes an anneal laser 260 that emits an initial laser beam 262, a modulator 264 operably connected to a modulator driver, and a scanning optical system 266 that receives the initial laser beam and generates the scanning laser beam 268. In an example, anneal laser 260 may be a QCW fiber laser that emits scanning laser beam 268 having a wavelength of, e.g., 532 nm. The foregoing is provided by way of example and other annealing laser systems now known or later developed may be utilized with the metrology systems disclosed herein. In an example, modulator 264 is an acousto-optical modulator (AOM) that is used on concert with scanning optical system 266 to selectively and alternately block and pass the initial laser beam 262 to control the scanning of annealing image 270 that results in a sweeping motion of the annealing image across the wafer surface.

In some examples, system 100 may optionally also include a pre-heat laser system 150 that operates in conjunction with annealing laser system 250 and is configured to generate a pre-heat laser beam 168. The pre-heat laser beam 168 is used to pre-heat wafer surface 12 by raising the either the wafer surface (or wafer subsurface) temperature $T_S$ to a pre-anneal temperature $T_{PA}$ that is less than the melt temperature $T_M$.

Pre-heat laser system 150 may include a pre-heat laser 160 and a line-forming optical system 166. The pre-heat laser 160 can include a diode laser, a fiber laser or a $CO_2$ laser, such as a continuous-wave (CW) p-polarized 10.6 micron $CO_2$ laser. In an example, line-forming optical system 166 is configured so that pre-heat laser beam 168 is incident on wafer surface 12 at a near normal incident angle or at a large oblique incident angle. In an example embodiment, the angle of incidence of pre-heat laser beam 168 is substantially equal to the Brewster's angle for wafer surface 12, so that adverse pattern density effects from non-uniform optical absorptions are reduced or minimized.

The line-forming optical system 166 is configured to receive an initial laser beam 162 from pre-heat laser 160 and form therefrom a pre-heat line image 170 (FIGS. 2 and 3) on wafer surface 12. The line-forming optical system 166 and scanning optical system 266 can each include lenses, mirrors, apertures, filters, active optical elements (e.g., variable attenuators, etc.) and combinations thereof. In an example, one or both of line-forming optical system 166 and scanning optical system 266 can be configured to perform beam conditioning, e.g., uniformize their respective laser beams 162 and 262 and/or provide the laser beams with a select cross-sectional shape. Non-limiting example optical systems suitable for performing such beam conditioning are disclosed in U.S. Pat. Nos. 7,514,305, 7,494,942, 7,399,945 and 6,366,308 the contents of which are incorporated by reference herein in their entireties. In an example, the initial laser beam 262 from anneal laser 260 has high quality (e.g., is substantially Gaussian) and is used without substantial (and in some cases, without any) beam conditioning.

System 100 also includes a scatter melt detector 280 that, as described more below, is configured with a scatter optical arrangement for detecting scattered light from a region of interest of wafer surface 12 for temporally and spatially resolving the scattered light to detect the onset of melt. Scatter optical arrangements of the present disclosure include systems based on a spatially resolved sensor or sensor array which does not detect specular reflection from a flat wafer surface, without the far-field specular reflection diffraction limit of the probe beam. One example form of a scatter optical arrangement is darkfield imaging. Probe controls (such as polarization & wavelength) and optical measurement post-selection (such as polarization filters, birefringent crystals etc.) can be also be used to capture the same or similar scatter information.

Example laser annealing system 100 further includes a controller 300. In an example controller 300 is or includes a computer, such as a personal computer or workstation. Controller 300 preferably includes any of a number of commercially available microprocessors, a suitable bus architecture to connect the processor to a memory device, such as a hard disk drive, and suitable input and output devices (e.g., a keyboard and a display, respectively). Controller 300 can be programmed via instructions (software) embodied in a non-transitory computer-readable medium (e.g., memory, processor or both) that cause the controller to carry out the various functions of system 100 to effectuate annealing of wafer 10.

Figure 10:
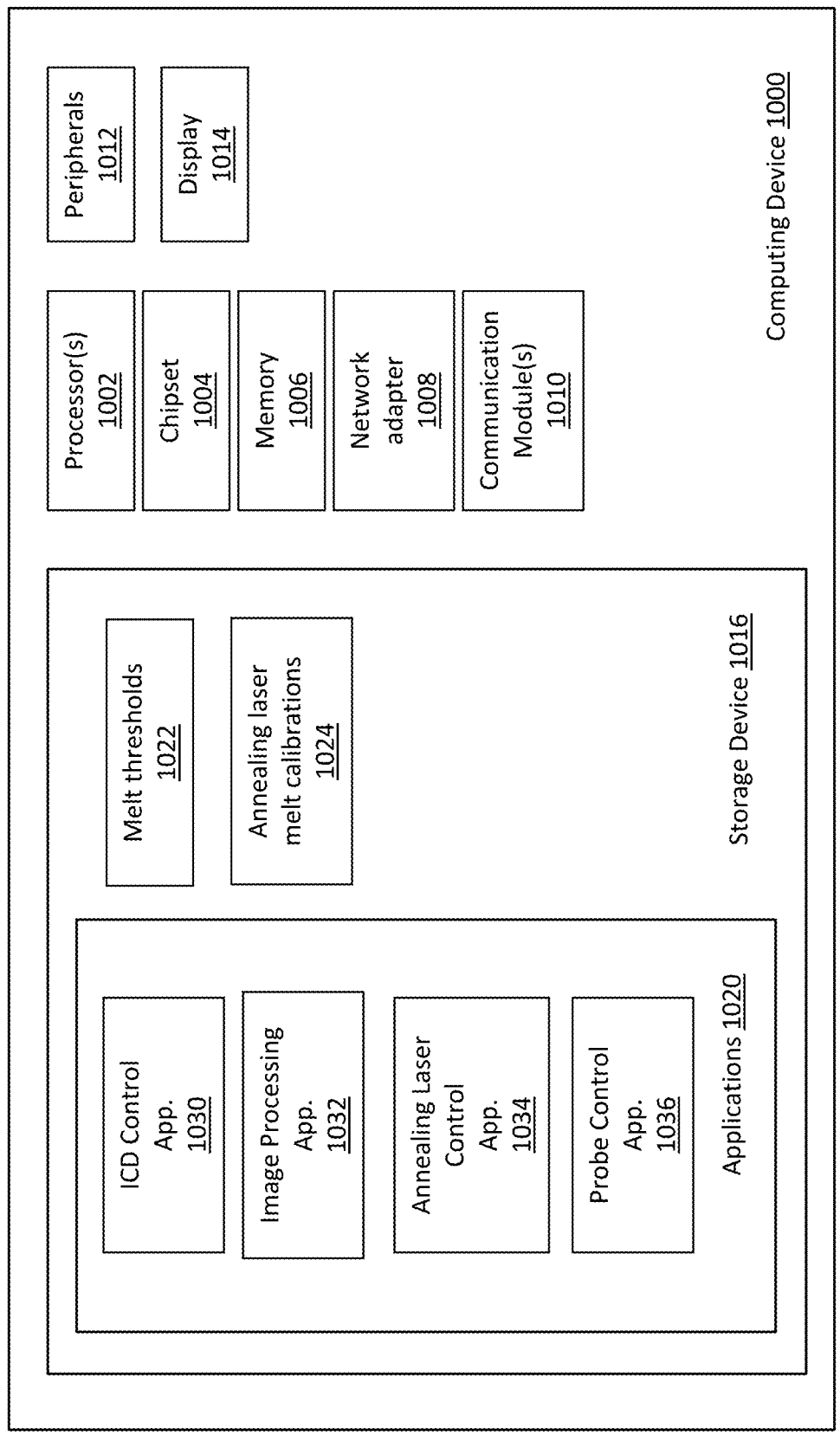
FIG. 10 is a functional block diagram of an example computing device.

Controller 300 is operably connected to pre-heat laser system 150 and scanning laser system 250 and controls the operation of these systems. Controller 300 is electrically connected to modulator 264 and controls the operation of the modulator with a control signal SMod. In an example, controller 300 includes digital signal processors (DSPs) (not shown) to control scanning functions in the pre-heat and scanning laser systems 150 and 250. In some examples controller 300 may also be operably connected to scatter melt detector 280 and scanning optical system 266 and is configured to receive and process a melt signal SM generated by the scatter melt detector during a laser annealing process for use in controlling the annealing laser system 250 or pre-heat laser system 150, just as adjusting a power level of the scanning laser beam 268 to achieve desired process conditions. In other examples, controller 300 may control a power level of the annealing laser system 250 according to previously obtained annealing laser melt calibration setpoints 1024 stored in a computer readable storage device 1016 (FIG. 10). Controller 300 or separate computing device may also be configured to control the components of scatter melt detector 280 such as control an image capture device (ICD) of the melt detector.

In an example of the operation of system 100, system controller 300 sends a first control signal 51 to pre-heat laser 160, which in response thereto generates initial laser beam 162. This initial laser beam 162 is received by optical system 166, which forms therefrom pre-heat laser beam 168, which forms pre-heat line image 170 at wafer surface 12. System controller 300 also sends as second control signals S2 to anneal laser 260, which in response thereto generates initial laser beam 262. This initial laser beam 262 is received by scanning optical system 266, which is controlled by a control signal SS to form scanning laser beam 268, which in turn forms annealing image 270 at wafer surface 12. System controller 300 also sends a third control signals S3 to stage controller 124 to cause the controlled movement of stage 120 to move (scan) wafer 10 relative to the pre-heat line image 170 and annealing image 270. In an example where chuck 130 provides wafer pre-heating, system controller 300 may also send another control signal (not shown) to a chuck controller to initiate or control wafer pre-heating. Typical chuck pre-heating ranges are from room temperature (25° C.) to 400° C.

Figure 2:
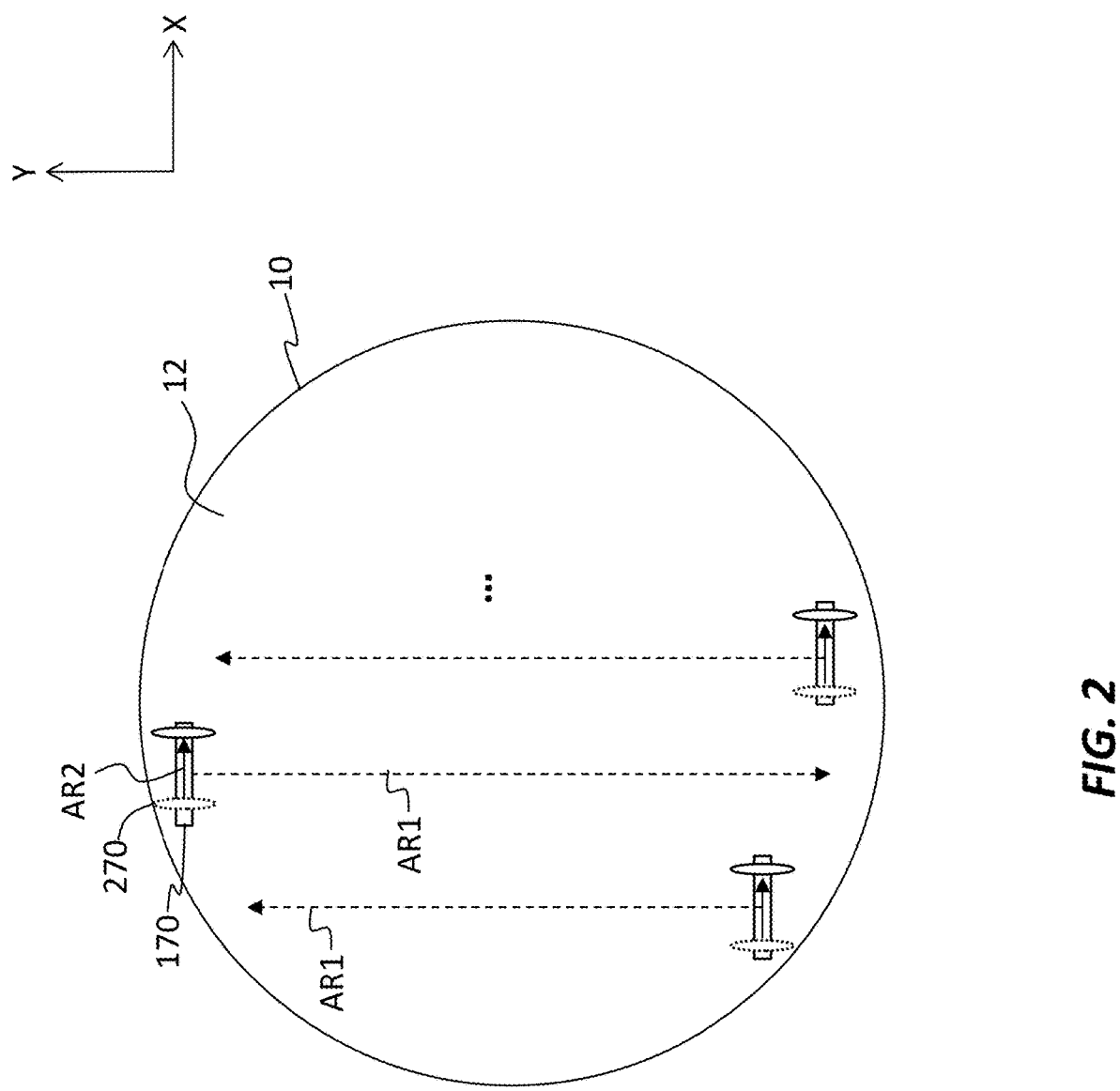
FIG. 2 is a top-down view of a semiconductor wafer illustrating an example method of scanning of the wafer surface with a pre-heat line image and an annealing image.

FIG. 2 is a top-down view of wafer 10 illustrating an example method of scanning of the wafer surface with an annealing image 270 and in examples where pre-heat laser system 150 is used, pre-heat line image 170. A movement of pre-heat line image 170 relative to wafer surface 12 can be achieved by translation of the stage 120 in a first direction, e.g., the y-direction, as indicated by arrow AR1, also referred to herein as the pre-heat scan direction or stage scan direction. The portion of wafer surface 12 associated with pre-heat line image 170 represents a locally pre-heated portion of the wafer surface wherein the wafer surface temperature $T_S$ is raised to the pre-anneal temperature $T_{PA}$. Annealing image 270 formed by scanning laser beam 268 moves relative to wafer surface 12 in a second direction that is orthogonal to the first direction, e.g., the x-direction, as indicated by arrow AR2, also referred to herein as the annealing scan direction or sweep direction.

The scanning optical system 266 is configured to scan or sweep annealing image 270 in the x-direction over pre-heat line image 170 across the length of the pre-heat line image. In one example, the scanning speed of annealing image 270 is sufficiently rapid as compared to the movement of the pre-heat line image 170 that the pre-heat line image is essentially stationary during the scanning of the annealing image.

Once annealing image 270 reaches the end of pre-heat line image 170, the scanning laser beam 268 and corresponding annealing image 270 are turned off by activating modulator 264 (FIG. 1) so that it blocks the transmission of initial laser beam 262. While the scanning laser beam 268 is "off," the pre-heat line image 170 moves in the y-direction so that the next portion of wafer surface 12 can be scanned. In an example, the movement of pre-heat line image 170 may be continuous, e.g., by continuously moving stage 120 in the y-direction. Once the pre-heat line image 170 is in place, the scanning laser beam 268 is turned back on by placing the modulator 264 in the transmission mode when the scanning optical system 266 can direct the scanning laser beam 268 and the corresponding annealing image 270 to a start position at a first end of a newly located pre-heat line image 170. Then the scanning of annealing image 270 over the newly located pre-heat line image 170 is carried out. FIG. 2 illustrates an example method of scanning substantially the entire wafer surface 12 (e.g., at least the patterned portions) by repeating the above-described scanning method. In other examples where the annealing system does not include a pre-heat laser such as pre-heat laser system 150, the pre-heat line image 170 is omitted and the annealing image 270 can be similarly rapidly scanned in the x-direction while the wafer 10 is moved by the stage 120 in the y-direction.

Figure 3A:
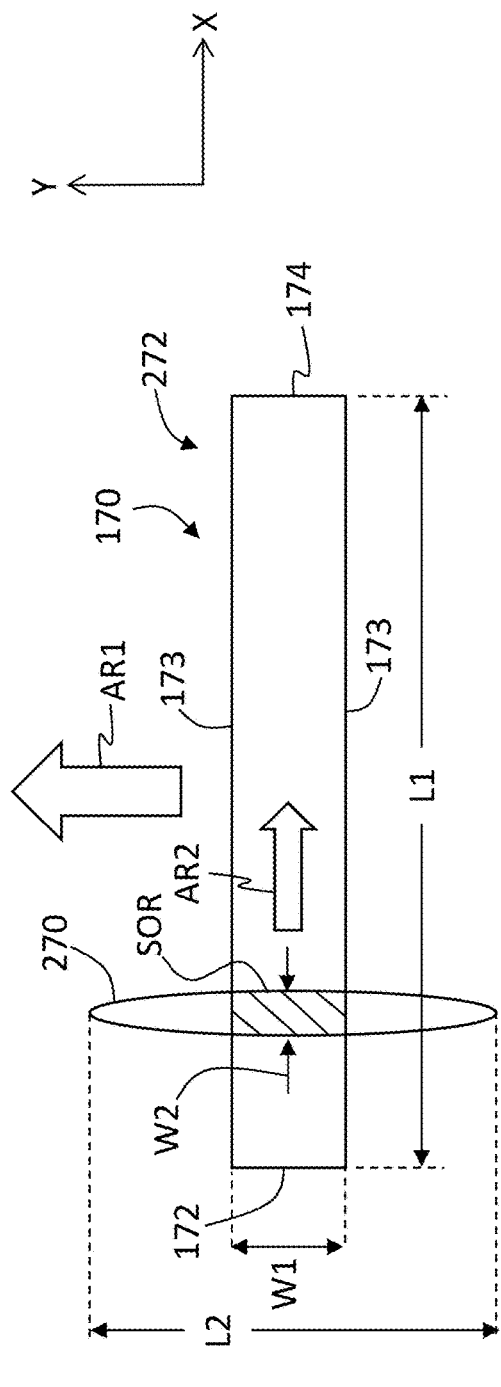
FIG. 3A is a top-down close-up view of the pre-heat line image and the annealing image formed on the wafer surface showing the relative dimensions and scan directions of the two images, and the scanning overlap region that defines the dwell time of the melt annealing process.

FIG. 3A is a top-down close-up view of one of pre-heat line image 170 and annealing image 270 formed on the wafer surface 12. The pre-heat line image 170 has a proximal end 172, a distal end 174, and opposite sides 173. The pre-heat line image 170 has a long direction (dimension) that runs from the proximal end 172 to distal end 174 and has a length L1. The pre-heat line image 170 also has narrow direction (dimension) measured between opposite sides 173 with a width W1. In an example, the length L1 is in the range from 5 mm to 20 mm, with an exemplary length L1 being in the range from 7 mm to 12 mm. Also in an example, width W1 is in the range from 50 µm to 200 µm, with an exemplary width W1 being 150 In an example embodiment, pre-heat laser beam 168 (FIG. 1) has a Gaussian intensity profile in a scanning direction (e.g., the y-direction), and a relatively flat top profile in the long (cross-scanning) direction (e.g., the x-direction). The beam width W1 can be defined at the $1/e^2$ intensity value of the Gaussian profile or at the full-width half-maximum (FWHM) of the Gaussian profile.

The annealing image 270 overlaps a portion of pre-heat line image 170, and the region of overlap is referred to herein as the scanning overlap region (SOR). The annealing image 270 has a long dimension with a length L2 and a narrow dimension with a width W2. In the illustrated example, the annealing image 270 has a substantially Gaussian intensity distribution in the x-direction and in the y-direction. The long dimension L2 of annealing image 270 is oriented in the direction of the short dimension W1 of pre-heat line image 170. In an example, the length L2 is in the range from 100 µm to 500 µm, while the width is in the range from 10 µm to 50 µm, and in some examples, the width is in the range from 15 µm to 20 µm or in the range from 16 µm to 18 µm. The scan direction AR2 of annealing image 270 perpendicular (orthogonal) to its long direction. The scan direction AR2 is also referred to as the annealing scan or sweep direction and is substantially orthogonal to pre-heat scan direction AR1. The width W2 of annealing image 270 defines the width of the scanning overlap region SOR in the annealing scan direction AR2. The rapid scanning of the annealing image 270 in the scanning direction AR2 results in the SOR forming an annealing illumination line 272 that has substantially the same size as pre-heat line image 170 that is sequentially moved along the wafer surface 12 in the y-direction (pre-heat scan direction AR1) by movement of the stage 120 in the y-direction.

In an example, length L2 is substantially greater than width W1 (e.g., between 2× and 4× larger) so that the ends of the annealing image 270 extend beyond the sides 173 of the pre-heat line image 170, as shown in FIG. 3A. This makes it relatively easy to align the pre-heat line image 170 and the annealing image 270 to define the scanning overlap region SOR. This configuration utilizes the central, high-intensity portion of the annealing image 270 to add to the localized pre-heating of the wafer surface provided by the pre-heat line image 170 to bring the wafer surface temperature $T_S$ up to the melt temperature $T_M$.

In one example, the dwell time $t_d$ of the scanning overlap region SOR is in the range 10 ns≤$t_d$≤500 ns, while in another example is in the range 25 ns≤$t_d$≤250 ns. For a width W2=15 µm and a dwell time of 25 ns, the scanning speed of annealing image 20 and thus the scanning overlap region SOR is $v_s$=(W2)/$t_d$=600 m/s. For a dwell time $t_d$ of 250 ns, the scanning speed is $v_s$=60 m/s. For a dwell time $t_d$ of 500 ns, the scanning speed is $v_s$=30 m/s. For a dwell time $t_d$ of 10 ns, the scanning speed is 1500 m/s. In one example, scanning optical system 266 is configured to provide these speeds or any speed therebetween.

Figure 3B:
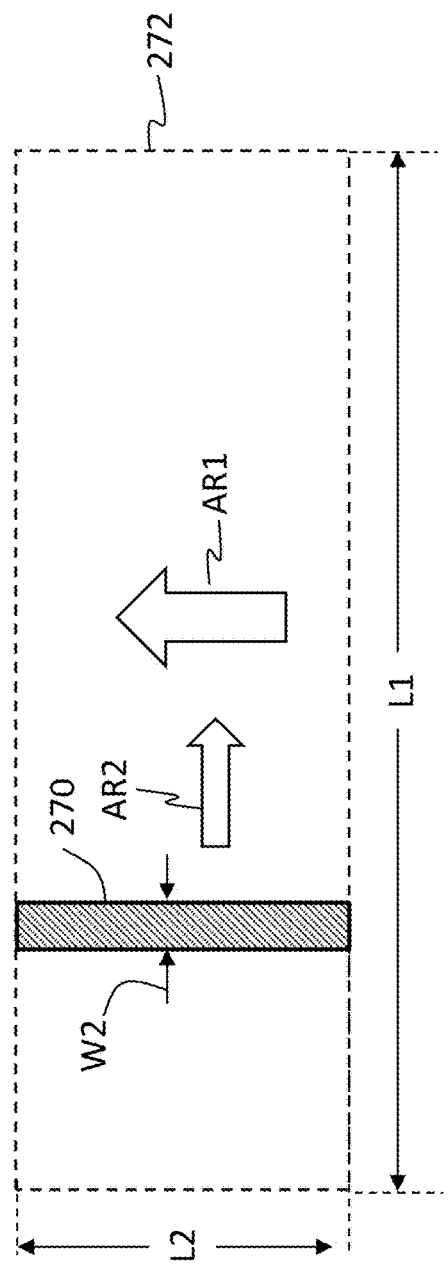
FIG. 3B is a top-down close-up view of an alternate example that does not include a pre-heat laser, showing the annealing image formed on the wafer surface and the sweep direction of the image and stage scan direction.

FIG. 3B is a top-down close-up view of another example implementation of system 100 where pre-heat laser system 150 is omitted. Annealing laser system 250 is designed and configured to raise the wafer surface temperature $T_S$ a desired annealing temperature. The rapid scanning of the annealing image 270 in the scanning direction AR2 results in an annealing illumination line 272 that is sequentially moved along the wafer surface 12 in the y-direction (arrow AR1) by movement of the stage 120 in the y-direction. In an example, the length L1 of the annealing illumination line 272 is in the range from 3 mm to 12 mm, width W2 of the annealing image 270 is in the range from 10 µm to 50 µm, and length L2 of annealing image 270 is in a range from 100 µm to 500 µm.

Figure 3C:
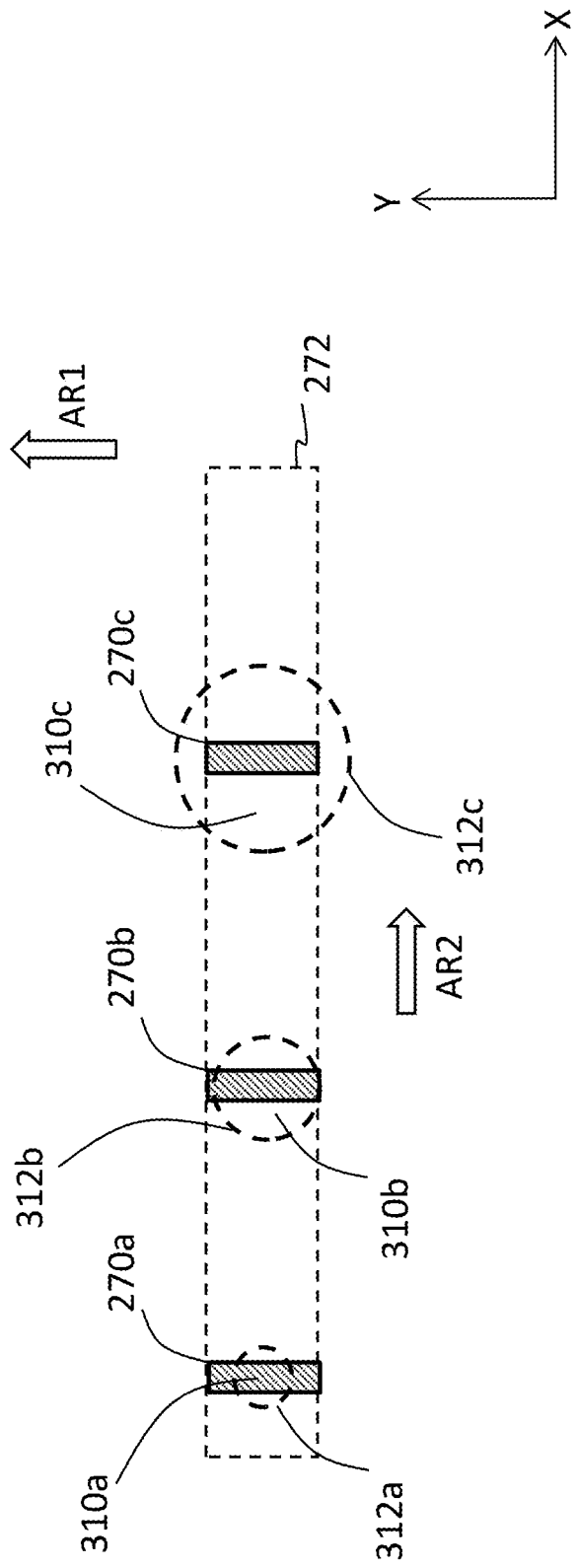
FIG. 3C is a top-down close-up view of a sweep of the annealing image and increasing volumes of liquid phase semiconductor material, referred to as a melt pool, along the sweep of the annealing image.

FIG. 3C is a top down view of a portion of wafer surface 12 showing three instances of time (labeled a, b, and c) of annealing image 270 traveling in the scan direction AR2 along annealing illumination line 272. FIG. 3C conceptually illustrates a melt pool 310 that has been formed by the scanning laser beam 268 in which a local area of the wafer surface 12 has melted and transitioned partially or fully from the solid to liquid phase resulting in an interface 312 between the solid and liquid phases. In the illustrated example a size of the melt pool 310 is increasing along the scan direction AR2, potentially due to an increasing optical power density of laser beam 268 through the sweep of the annealing image 270 across the annealing illumination line 272. The phase transition of the wafer material within melt pool 310 is a first order phase transition that results in a discontinuity in both the density and the form of inter-atomic or inter-molecular interactions of the wafer material(s). The phase transition results in a significant change in the indices of refraction of the material due to the different electromagnetic interactions in the two different phases (solid and liquid) of the material. In an example an index of refraction of the liquid phase within melt pool 310 is substantially higher than an index of refraction of the solid phase wafer material outside of melt pool 310, for example, on the order of 100% to 300% higher index of refraction for typical IC semiconductor materials.

Interface 312 between the melt pool 310 and the solid phase material surrounding the melt pool acts as a primary scatterer of incident light, where a magnitude of the wide-field structure factor grows with the radius $r_l$ of the melt pool 310. The scatter imaging systems disclosed herein are designed and configured to detect the scattered light that occurs at the onset of melt and when a melt pool 310 initially begins to form. The intensity of scattered light increases rapidly and nonlinearly with an increasing size of the melt pool 310 and the scatter imaging systems of the present disclosure may be configured to detect the increasing intensity of scattered light resulting from the increasing extent of melted wafer material.

Below melt in the solid phase a relationship between an intensity of a reflected light signal and material temperature can be approximated as roughly linear, $\gamma T$, where $\gamma$ is a scaling factor and T is the material temperature. For melt pools 310 smaller than a wavelength of the incident light, e.g., a wavelength of laser beam 268, the scattering strength of the melt pool 310 and interface 312 is approximately $\alpha V^{4/3}$, where $\alpha$ is a scaling factor and V is a volume of the melt pool, or a $4^{th}$ power of the radius of the melt pool, where a magnitude $\alpha \gg \gamma$. For melt pools 310 significantly greater than the wavelength of the incident light, the discontinuity on the melt pool of radius $r_l$ is the primary scatterer into the wide-field, with magnitude approximated as $\alpha V^{2/3}$. As such, the overall scaling relationship between increasing optical power and melt pool size is highly nonlinear, and can eventually saturate a scatter imaging system. In the example shown in FIG. 3C, the initial formation of a melt pool 310 will result in a sharp discontinuity in the light detected by scatter melt detector 280 due to the sudden increase in scattered light emitted from the region surrounding the melt pool. As the size of the melt pool 310 grows (e.g., the size of melt pools 310b and 310c as compared to melt pool 310a) the intensity of light detected by scatter melt detector 280 will increase nonlinearly on the order of a $4^{th}$ power of the increasing radius of the melt pool, which may quickly saturate the melt signal SM generated by the melt detector. Scatter melt detector 280 and the scatter imaging channels disclosed herein are designed and configured to be highly sensitive to the onset of melt where a discontinuous increase in the intensity of light captured by the melt detector occurs substantially instantaneously at the onset of melt, resulting in an increase of several orders of magnitude in the intensity of the light signal.

During the annealing process, scatter melt detector 280 can be used to capture light from an area surrounding the annealing image 270, including light that is diffracted, reflected, or refracted by optical structures in the region of the anneal image. In an example, scatter melt detector 280 generates a melt signal SM representative of the detected light and sends the melt signal to controller 300. In an example, controller 300 receives the melt signal SM and may use the signal to create a feed-back loop that controls one or more characteristics, such as the power level, of annealing laser system 250, and in some examples, pre-heat laser system 150, so that the wafer surface temperature $T_S$ can be controlled. In some examples scatter melt detector 280 may be used to calibrate and track the optical performance of annealing laser system 250. And in some examples, scatter melt detector 280 may be used to develop a wafer-specific laser power calibrations that provide melt threshold laser power setpoints for a set of predetermined annealing process conditions.

Figure 4B:
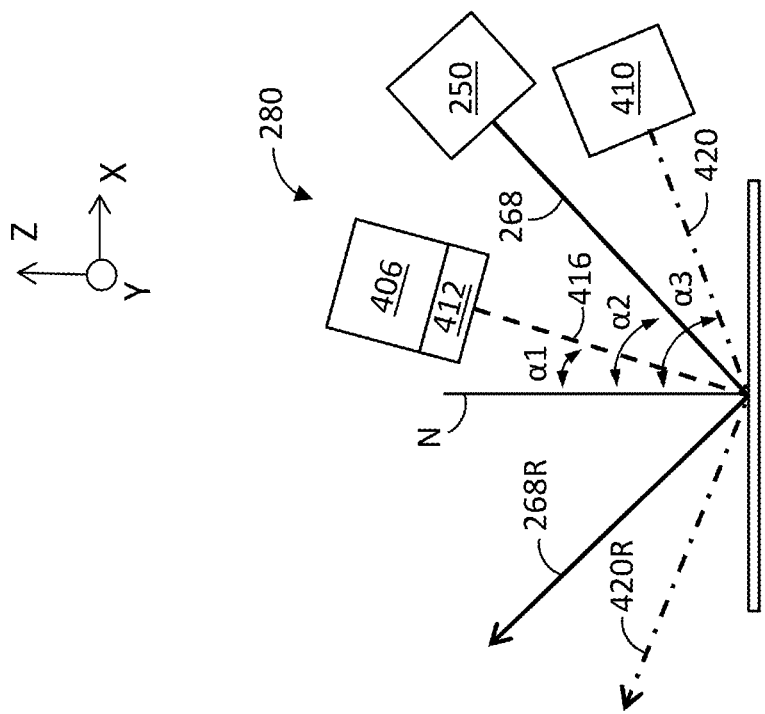
FIG. 4B is a schematic diagram of an example scatter melt detection system that includes a light source probe separate from the laser process beam.
Figure 4A:
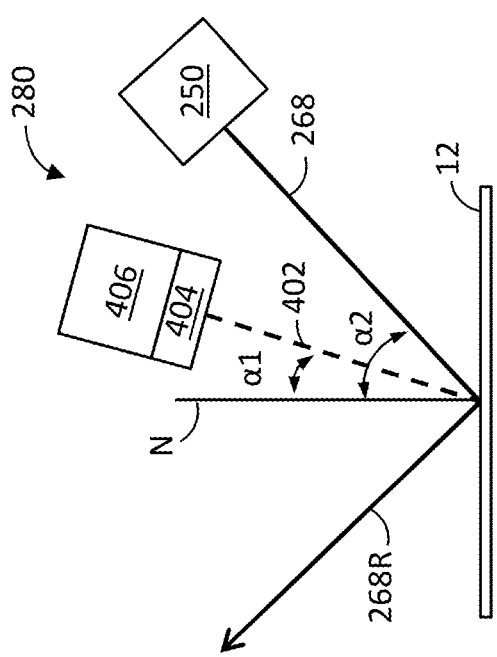
FIG. 4A is a schematic diagram of an example scatter melt detection system wherein the laser process beam is utilized as the light source probe.

FIG. 4A illustrates a side view of one example implementation of scatter melt detector 280. In the illustrated example melt detector 280 receives light from wafer surface 12 along a scatter detector path 402 that has an angle $\alpha 1$ with respect to surface normal N that is different than an angle $\alpha 2$ of the scanning laser beam 268. In the illustrated example the scanning laser beam 268 is simultaneously utilized as the probe for a scatter thermometry measurement and as the annealing laser beam. In other examples a light source other than the scanning laser beam 268 can be utilized as the probe. Utilizing the scanning laser beam 268 as the light source for the scatter measurement provides the benefit of a simpler arrangement because an additional light source it not required and because it illuminates only the field of view around the small annealing image 270, which can travel rapidly, e.g., up to around 1 km/s, across the wafer surface 12.

Scanning laser beam 268 has an angle of incidence $\alpha 2$ with respect to surface normal N that is different from angle $\alpha 1$ and forms the annealing image 270 on the wafer surface 12. The angle $\alpha 1$ of scatter detector path 402 is designed so that specular reflection 268R of scanning laser beam 268 from the surface 12 of wafer 10 does not enter the scatter detector path 402 enabling scatter observations by melt detector 280.

Melt detector 280 includes optics 404 and an image capture device (ICD) 406. ICD 406 includes or is electrically connected to at least one pixelated two-dimensional CCD or CMOS focal plane array (FPA) and associated electronics known in the art of image capture devices, including a processor and storage unit for storing captured images. Optics 404 are configured to image wafer surface 12 onto the FPA. In an example, ICD 406 is configured to capture scatter images over a relatively long exposure time frame as compared to the dwell time of laser beam 268, e.g., approximately 50 us image frame capture rate, such that at least one entire sweep of the annealing image 270 across the annealing illumination line 272 is captured in a single image frame.

Optics 404 may include one or more lenses, mirrors, filters, gratings, apertures or other components. The light collected along scatter detector path 402, e.g., scattered light, is collected and in some cases reflected and/or filtered by the optics 404 and imaged on the FPA of the image capture device 406. The field of view (FOV) of the optics 404 may include the entirety of the wafer surface 12 or a portion thereof. For example a FOV optics 404 may have a width in the scan direction AR2 (see FIG. 3B) that is about equal to length L1 of annealing illumination line 272, or a width in direction AR2 that is about 5% to about 50% greater than length L1 of the annealing illumination line. A width of the FOV of optics 404 in stage scan direction AR1 (see FIG. 3B) may be the same as the width of the FOV in the annealing image scan direction AR2 or may be greater or less than the width of the FOV in the scan direction AR2. In an example a width of the FOV of optics 404 in stage scan direction AR1 is at least twice a diameter or outer extent of annealing image 270 in the stage scan direction so that portions of wafer surface 12 that are below melt and outside of the annealing image are captured in the same image as portions within the annealing image. The FOV of optics 404 in the sweep direction AR2 may be at least 10% greater than length L1 of illumination line 272, and in some examples, at least 20% greater. A spatial resolution of ICD 406 may be 10 um/pixel to 50 um/pixel and in some examples about 30 um/pixel.

As illustrated, a light source, here annealing laser system 250, produces scanning laser beam 268 that forms an annealing image 270 on the wafer surface 12. A first portion of the light of scanning laser beam 268 is specularly reflected by the wafer surface 12 and does not reach melt detector 280. When a temperature of the wafer surface 12 along the annealing illumination line 272 is below a melt temperature and the wafer material is in solid phase, scatter melt detector 280 may detect some amount of background light, such as light from photoluminescence and scattered light due to, for example, defects in the wafer surface 12 such as small changes in thickness or large scale defects such as scratches or dust, or, in the case of processed wafers, light that is diffracted, reflected, and/or refracted from optical discontinuities in the wafer such as manufactured patterns in the wafer surface or subsurface. Thus, in the case of an unprocessed and highly polished wafer 10 melt detector 280 may detect little to no light along scatter detector path 402 and a field of view of melt detector 280 is substantially dark. In the case of processed wafers some level of scattered light associated with a sub-melt solid phase condition may be captured.

When a power density of scanning laser beam 268 is raised to a melt threshold energy density $E_m$, a phase transition in the wafer material at the wafer surface 12 or subsurface occurs, resulting in a volume of melted liquid-phase material located approximately in the annealing image 270. The reflectivity of the melted liquid phase material is substantially different from the reflectivity of the material in the solid phase. The interface between the solid and liquid phases of the newly formed volume of liquid (e.g. interface 312 (FIG. 3C)) creates a new optical discontinuity in the wafer surface that strongly scatters light into $2\pi$, the hemisphere of angles above the melted region of the wafer. The observed reflection in the melt region (e.g. melt pool 310) is diffuse and in some examples approaches a Lambertian reflectance. A resulting intensity of a imaging thermoreflectance signal of the melt region will have a substantial increase as compared to solid phase, e.g. on the order of a 50% increase. A change in the intensity of the scatter imaging thermoreflectance signal along scatter detector path 402 due to the material phase transition from solid to liquid, by contrast, is extreme, on the order of e.g., 100,000% higher intensity, providing exquisite sensitivity to the detection of the onset of melt.

In an example, ICD 406 captures scatter images over a length of time that is greater than the dwell time of the annealing image 270 and at a corresponding frequency $$f \le \frac{1}{t_d}.$$

Scatter melt detector 280 resolves time along the annealing laser sweep direction AR2, with the annealing image 270 moving at velocity v, with x=v*t. In this way the captured scatter images can be used to decompose scatter signal data along the x direction (sweep direction AR2) into power fluctuation spectrum measurements at bandwidths out to $$f = \frac{1}{t_d}.$$

With a scatter image frame including an entire sweep or multiple sweeps of the annealing image 270, scatter melt detector 280 can be used to measure process uniformity over the entire annealing image sweep stripe in a single image frame. In an example, scatter melt detector 280 is configured to measure melt behavior and uniformity at frequencies $$f \le \frac{1}{t_d}$$

by capturing scatter images that can be spatially resolved for all points x=v ($t \pm t_d$) in a single frame, which is highly practical and useful for optimization of annealing laser system 250.

FIG. 4B illustrates another example implementation of scatter melt detector 280 where a probe light source 410 that is separate from annealing laser system 250 is utilized as the probe for scatter measurements. The illustrated example has a similar configuration as the example shown in FIG. 4A, including a detector that includes optics 412 that can include the same or similar components as optics 404 and ICD 406. Probe light source 410 may be a pulsed light source that emits probe light 420 that is incident on wafer surface 12 in an area that overlaps annealing image 270. As with the example shown in FIG. 4A, the scatter melt detector 280 in FIG. 4B has a scatter detector path 416 such that optics 412 does not capture specular reflection 420R of probe light 420 or specular reflection 268R of scanning laser beam 268. In the illustrated example melt detector 280 receives light from wafer surface 12 along a scatter detector path 416 that has an angle $\alpha 1$ with respect to surface normal N that is different than an angle $\alpha 2$ of the scanning laser beam 268 or an angle $\alpha 3$ of the probe light 420. Probe light source 410 may be a diode, or an optical fiber connected to a laser source and may emit a narrow wavelength of light, e.g., green, blue, NIR, or in the telecom band, e.g., between 1260 nm and 1675 nm. Optics 412 may be configured to filter out wavelengths of light other than probe light 420. Probe light source 410 can be configured to emit pulses of probe light 420 at a greater frequency or a shorter time duration than a frame rate of ICD 406 so that discrete portions of annealing illumination line 272 can be imaged.

FIGS. 5A and 5B conceptually illustrate two alternate optical arrangements 500, 501 for scatter imaging. Arrangement 500 includes an objective lens 502 and image forming lens 504 for forming a scatter image of a region of wafer surface 12 containing a melt pool 310 on an FPA of an ICD, e.g., ICD 406. Arrangement 500 corresponds to the examples illustrated in FIGS. 4A and 4B where light, such as scanning laser beam 268 (in the FIG. 4A example) or a separate probe light source (e.g. probe light 420 in the FIG. 4B example) is incident on an object, e.g. melt pool 310. In terms of Fourier optics, the zeroth order light 530 (unscattered light) does not reach objective lens 502 due to the spatial position and numerical aperture of lenses 502 and 504 so that the image formed on the FPA is from higher order diffraction intensities 532 scattered by the melt pool 310 and/or other optical scatterers or discontinuities on the wafer surface or subsurface.

FIG. 5B illustrates an alternate optical arrangement 501, wherein at least one opaque light stop 520 is utilized to block the zeroth order light 530 (unscattered light) from reaching the FPA of the ICD, e.g., ICD 406 so that the image formed by objective lens 510 and image forming lens 512 on the FPA is from higher order diffraction intensities 532 scattered by the melt pool 310 and/or other optical scatterers or discontinuities on the wafer surface or subsurface. The scatter melt detector 280 of FIG. 4A or the scatter melt detector of FIG. 4B may be modified to have optical arrangement 501 that utilizes the at least one opaque light stop 520 to form a scatter image.

FIG. 6A conceptually and graphically illustrates data captured in an image frame by ICD 406 of scatter melt detector 280 during a sweep of the annealing image 270 when the wafer surface 12 is below melt. FIG. 6B conceptually illustrates the change in the data captured in an image when the optical power of the annealing laser system 250 is increased and the temperature of wafer surface 12 exceeds the melt threshold and the wafer material begins to melt.

Below melt, the image captured by melt detector 280 is the probe intensity $I(\vec{x})$ scattered by the roughness of the wafer and in some cases resonant scatterers embedded in the wafer surface 12. In the thin film approximation, the roughness due to height differences $\delta(\vec{x})$ imposes itself as a random holographic phase grating $\phi(\vec{x})$, which imposes itself on the electric field as $e^{i\phi(\delta(\vec{x}))} = e^{i\alpha\delta(\vec{x})}$. The fluctuation power spectrum, the square of the Fourier transform of $\delta(\vec{x})$, $|\mathcal{F}(\delta(\vec{x}))|^2 = |\delta(\vec{k})|^2$, is typically non-zero well past $$\vec{k} = \frac{4\pi}{\lambda}$$

for uniform wafer manufacture processes, and so will uniformly scatter $I(\vec{x})$ into the half-hemisphere above the wafer plane. FIG. 6A is conceptually illustrating this low-light and relatively flat response that may occur below melt.

For processed and highly patterned wafers 10, some material manufacture processes include rare optical scatterers into thin films which can produce random images which may provide a false melt signal. When the image data from melt detector 280 is averaged across compiled image frames, however, the below melt false melt signals can be distinguished from a true melt signal because a high intensity signal emerges in the compiled image frames uniformly over an entire sweep across an annealing illumination line 272 with increased optical power density of the annealing laser 250. Aspects of the present disclosure include compiling a set of high resolution images of a wafer 10 below melt to sample a shape of the illuminating probe beam, e.g. scanning laser beam 268 or probe light 420 from probe light source 410. The below-melt image data can then be distinguished from above-melt image data, which will include a high intensity artifact of the melt pool 310 of radius $r_{melt} < r_{beam}$ and associated interface 312. The shortened absorption length of the probe beam in the liquid phase portion of the wafer material in the melt pool reduces the scattering caused by sub-surface optical discontinuities in a processed wafer, thereby simplifying the scatter optical response when the melt threshold is exceeded which further facilitates detecting the onset of melt.

FIG. 6C illustrates a image frame of test data from an example implementation of system 100 using amplitude of the captured light to identify melt. FIG. 6C illustrates an example of a system that is not properly optimized, where the beginning of the annealing image sweep (top of the image) and the end (bottom) are both above melt, and the dim region in the middle is just below melt. The optical power density of the annealing laser system 250 was not properly calibrated resulting in unwanted fluctuations in the optical power that resulted in the beginning and end of the sweep being above melt and the middle of the sweep being below melt.

Figures 7A, 7B, 7C:
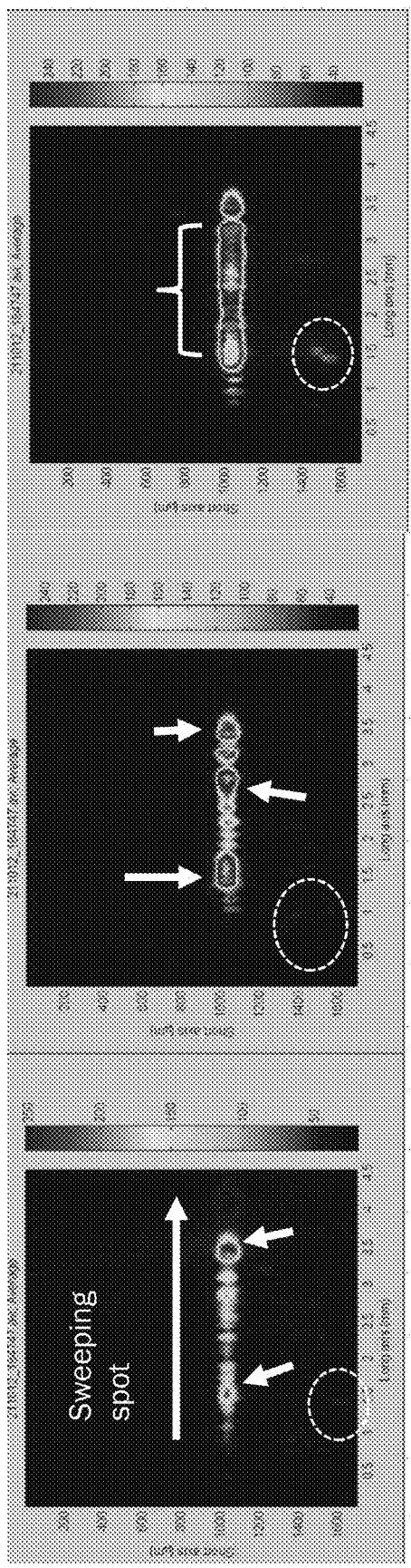
FIGS. 7A-7C illustrate test data from a melt threshold calibration where laser power was incrementally increased and the increasing extent of melt was detected in the test data.

FIGS. 7A-7C illustrate test data from a melt threshold calibration for a particular processed wafer type with a unique material stack and at a particular chuck temperature. FIGS. 7A-7C show one or more sweeps from three different stripes of the scanning laser beam 268, where a stripe is a series of consecutive sweeps. In FIG. 7A the power of annealing laser system 250 was set at 132 W, in the next stripe in FIG. 7B the power level was increased to 135 W and in the third stripe in FIG. 7C the power was increased to 138 W. The arrows point to locations in the image where the signal is saturated indicating the high intensity of light in those regions of the image due to melting of the wafer material causing a sharp increase in scattered light. The images in FIGS. 7A-7C also show low-intensity artifacts caused by the inherent roughness and non-uniformity of the processed wafer (some of the low intensity artifacts are circled in dotted line in each figure). However, the high intensity locations corresponding to melted regions of the wafer have a greater spatial density and a magnitude that is many orders of magnitude greater than the below melt background light in the scatter image and strongly stand out from the background scattering. FIGS. 7A-7C illustrate an example where a melt threshold can be calibrated for a specific processed wafer type with a unique material stack by raising the laser power & studying the melt metrology.

Figure 8:
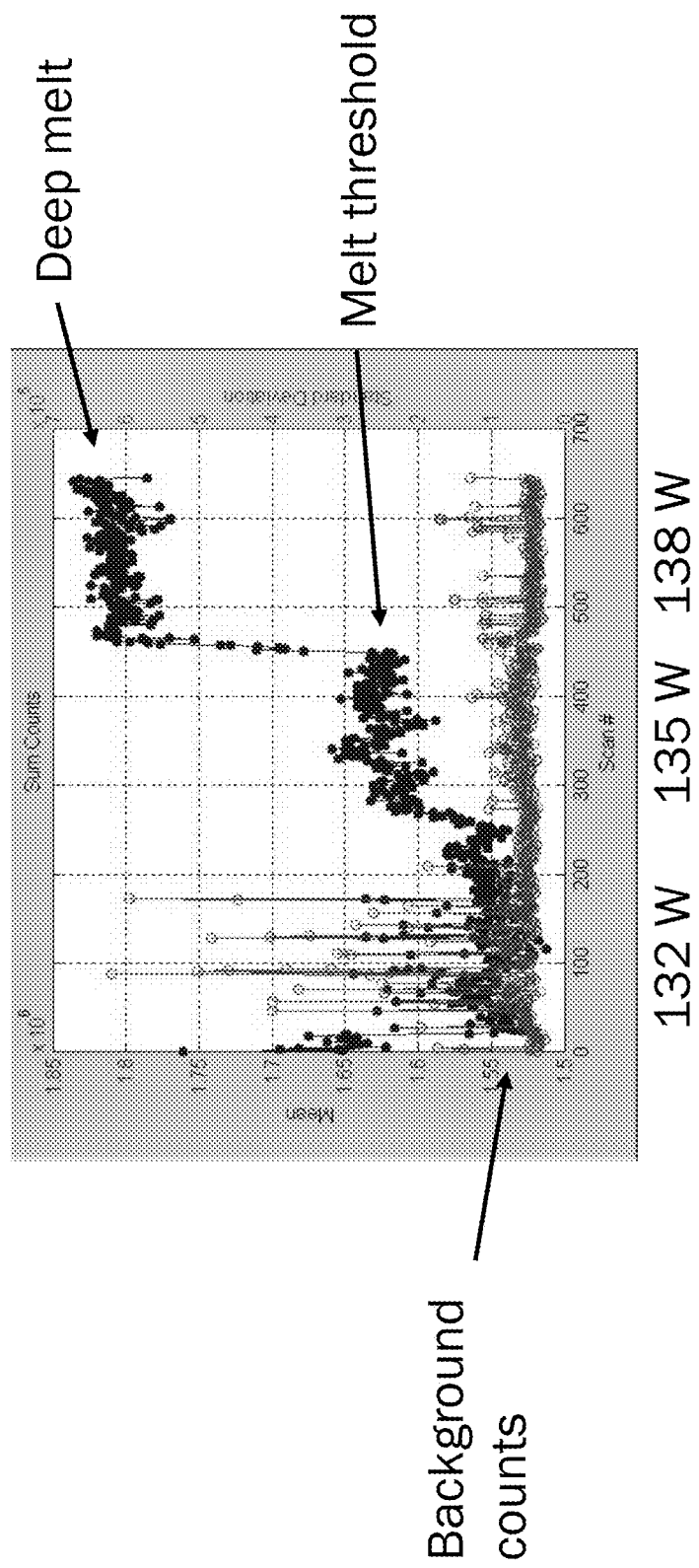
FIG. 8 illustrates FPA cumulative intensity data for a series of annealing processes at increasing power levels below and above a melt threshold power level.

FIG. 8 illustrates additional data from the same calibration process as illustrated in FIGS. 7A-7C. The Y axis is a cumulative intensity of light captured by the FPA of the ICD 406. More specifically, the Y axis is the sum of all grey values of all pixels in an image, where each pixel of the FPA records the level of the intensity of incident light on a grey level scale between 0 (black) and 1 (white) as is known in the art. The X axis is the annealing image sweep number. FIG. 8 shows a first plurality of sweeps of the annealing image at 132 W and the sum of the grey values is a first value that is low and represents a below melt condition and the background light scattering captured by the FPA of ICD 406. FIG. 8 shows an increase in the grey values when the power is increased to 135 W which was determined to be the melt threshold and then a sharp increase in the intensity of light captured by ICD 406 when the laser power was increased to 138 W which was determined to be beyond the melt threshold and liquid volumes of wafer material were consistently formed across a large proportion of the annealing image sweep.

Figure 9:
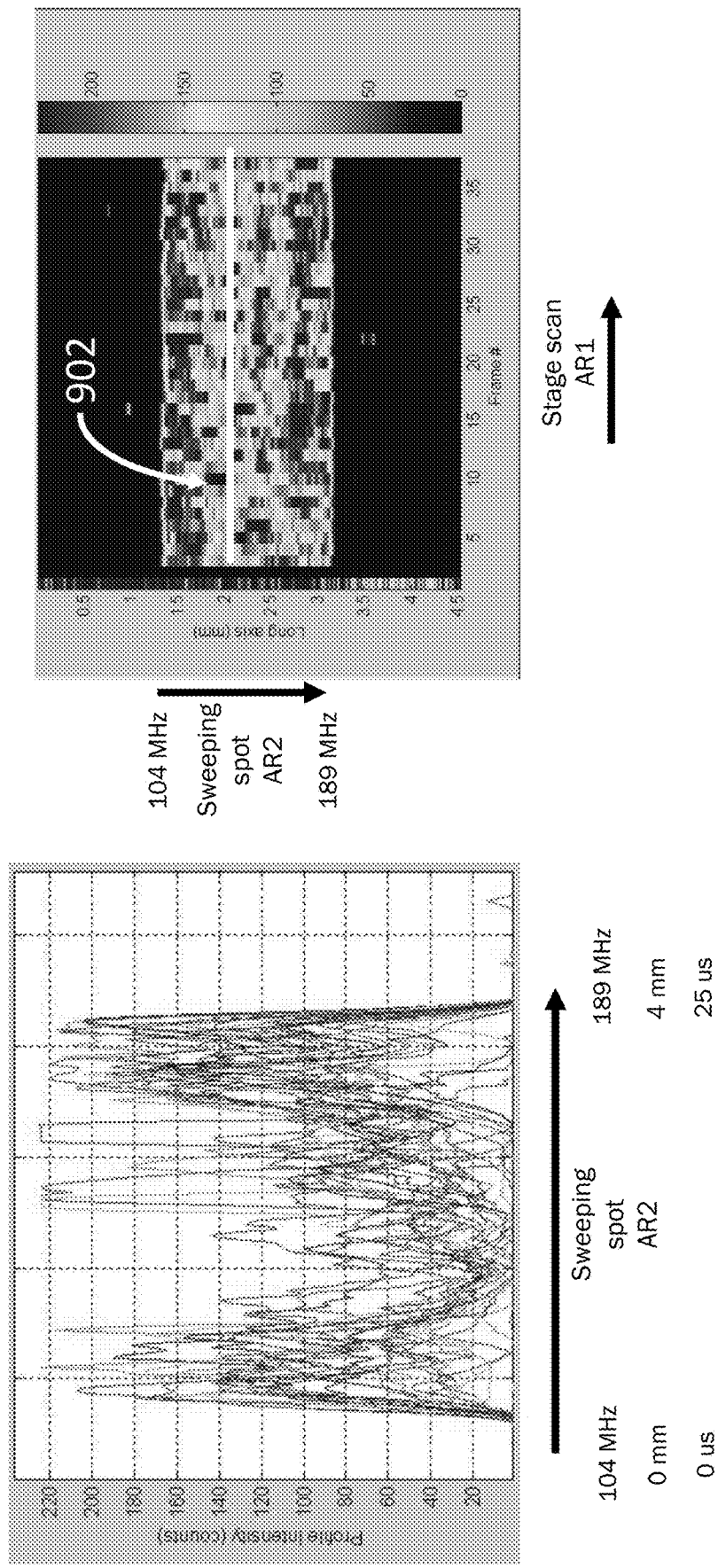
FIGS. 9A and 9B illustrate scatter image data for a plurality of sequential annealing images sweeps along a semiconductor surface with an annealing laser operating at a melt threshold power level.

FIGS. 9A and 9B illustrate test data for a well-optimized system with the power of the annealing laser system 250 set at what was determined to be the melt threshold for the semiconductor wafer. FIGS. 9A and 9B show the same data in two different formats. Each is a collection of profile analyses from many image frames in the high-velocity spot-sweeping direction. In FIG. 9A, the Y axis is intensity and the X axis is position along the annealing image sweep, with the light intensity profiles for a plurality of sequential sweeps overlayed. In FIG. 9B the same sweep intensity profiles are shown on a three dimensional color map with the Y axis being the position in the annealing image sweep direction, the X axis being image frame and position in the stage scan direction and the color indicating the intensity of the light signal. FIG. 9B is a mosaic of a plurality of image frames captured with scatter melt detector 280.

A location in an image frame can be translated to an instance in time and a specific location along an annealing image sweep with the knowledge of the velocity of the annealing image and the spatial resolution of the ICD. By way of example, if the velocity of the annealing image sweep is 500 m/s and the spatial resolution of the ICD is 30 um/pixel each pixel represents 60 ns in time and an image of an annealing image sweep with a 50 ns exposure can be resolved into 60 ns time increments. More generally, scatter melt detector 280, e.g., the example illustrated in FIG. 4A, can be used to measure melt behavior and uniformity at frequencies $$f \le \frac{1}{t_d}$$

by spatially resolving all points $x=v\cdot(t\pm t_d)$ in a single frame which is practical and useful for optimization of annealing laser 250. In examples where a pulsed probe separate from the process laser beam is utilized, as in FIG. 4B, data at greater frequencies can be obtained.

In some examples there may be a small variability in the optical power density of scanning laser beam 268 across the sweep of the annealing image 270. A method of calibrating the annealing laser system 250 may, therefore, include analyzing the melt signal from scatter melt detector 280 at a particular point in the sweep across multiple sweeps to eliminate any effect from variability in optical power along the sweep from the calibration process. By way of example, location 902 in FIG. 9B illustrates a particular sweep location where the melt signal from multiple sweeps at location 902 can be analyzed. For example, a power level of the annealing laser system 250 can be incrementally adjusted, e.g., in fractions of a percent of total power, to identify a percentage of sweeps of the annealing image where melt is detected. For example, for a given chuck temperature $T_{ch}$, and dwell time $t_{dwell}$, there exists a melt threshold energy density $E_m(T_{ch}, t_d)$, and an actual energy density delivered is $E_m \pm \delta_E$. Melt is rarely detected at setpoint power $E_m - \delta_E$ as the power occasionally hits the melt threshold. Melt is always detected at $E_m + \delta_E$, above the range of the process. By varying the power of scanning laser beam 268 from below $E_m - \delta_E$ to above $E_m + \delta_E$ over a series of stripes and analyzing the percent of time that melt is detected at a particular sweep location (e.g. location 902), both $E_m$ and $\delta_E$ can be independently identified from the energy below which melt is never detected and the energy above which melt is present in all or substantially all of the sweeps. In an example, during an annealing process the power level of the scanning laser beam 268 is incrementally varied throughout the annealing image sweep. Thus, the foregoing calibration process can be repeated at a plurality of sweep locations to determine the melt threshold power level setpoint across the entire sweep of the annealing image.

Controller

FIG. 10 is a block diagram illustrating physical components of one example implementation of one or more computing devices 1000 that may be utilized with annealing systems of the present disclosure, including for providing the functionality for controller 300, stage controller 124, and melt detector 280. Illustrated are at least one processor 1002 coupled to a chipset 1004. Also coupled to the chipset 1004 are a memory 1006, a network adapter 1008, and communication module(s) 1010. Peripherals 1012 and display 1014 are coupled to the computing device 1000. In another embodiment, the memory 1006 is coupled directly to the processor 1002. A storage device 1016 is also coupled to the chipset 1004.

Storage device 1016 may be any non-transitory computer-readable storage medium, such as a hard drive, compact disk read-only memory (CD-ROM), DVD, or a solid-state memory device. Storage device 1016 may contain any software or data that may be stored in computer storage in communication with an annealing system as is known in the art of laser annealing systems. FIG. 10 also shows a non-limiting example list of applications 1020 that may be stored on storage device 1016 as well as melt threshold values 1022 and annealing laser melt calibration setpoints 1024.

In the illustrated example applications 1020 include an ICD control application 1030 and an image processing application 1032 that include instructions for controlling an ICD of a scatter melt detector, e.g., ICD 406 of scatter melt detector 280. ICD control application 1030 may include instructions for controlling functions such as frame rate and shutter speed, and for processing signals generated by the FPA(s) of the ICD. Image processing application 1032 may be configured to perform one or more image processing algorithms to analyze the light collected from a scatter detector path having a FOV that includes an annealing image.

As described herein, when an annealing image, e.g., annealing image 270, causes material on or below wafer surface 12 to begin to melt, substantial changes in the optical characteristics of the material occur that results in a significant increase in the intensity of light collected by a scatter melt detector. Image processing application 1032 may be configured to identify increases in the intensity of light collected by the ICD using any of a variety of image processing algorithms. For example, one or more of fitting algorithms, edge detection algorithms, eigenbasis decompositions, feed-forward classifiers, or the detection of any intensity in a captured image frame that exceeds a melt threshold value, or an intensity value corresponding to a light scattering effect caused by an interface between liquid and solid phases of the wafer material. In an example image processing application 1032 may be configured to identify increases in the intensity of light collected by the ICD in an area that is smaller than the annealing image 270 formed by a process beam, e.g., laser beam 268. In an example, image processing application 1032 may compare light intensities to melt threshold values 1022, which may include threshold values corresponding to an intensity of light captured by scatter melt detector 280 for differently sized melt pools or thresholds that relate light intensity to below-melt intensities and laser power levels. Referring to FIG. 3C as an example, image processing application 1032 may be configured to detect the onset of melt and the formation of a melt pool 310 and corresponding interface 312 by detecting an intensity of light captured along scatter detector path 402 or 416 that exceeds a relative scattering intensity above that of the surrounding probe beam. In an example the thresholds may be normalized to a sub-melt scattered-beam light intensity profile. Image processing application 1032 may also be configured to analyze a spatial density or spatial extent of an image frame that includes an intensity of light that exceeds a melt threshold in order to differentiate between a true melt signal and discrete false signals caused by non-melt scatterers. Image processing application 1032 may also be configured to compare a spatial location of high intensity signal in an image frame to a known location of the moving annealing image 270 and/or a location of the annealing illumination line 272 to verify a high intensity signal is overlapping or immediately adjacent the annealing image or annealing illumination line.

Figure 11:
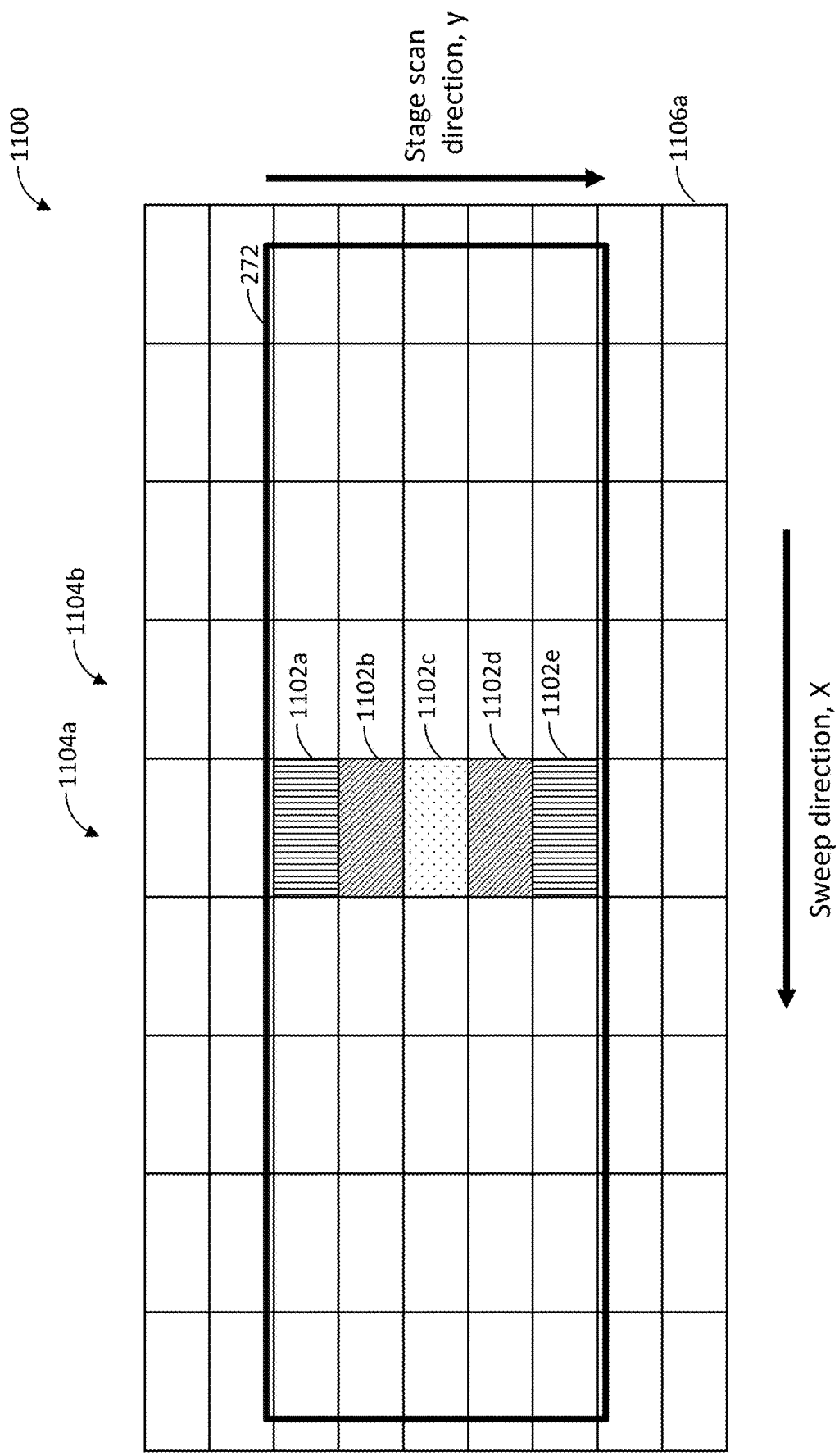
FIG. 11 conceptually illustrates a portion of an example image frame captured by ICD of a scatter melt detector during an annealing process.

FIG. 11 conceptually illustrates a portion of an example image frame 1100 captured by ICD 406 during an annealing process. FIG. 11 shows a grid of pixels 1102 and a portion of illumination line 272. The image frame 1100 consists of a plurality of columns 1104 (two columns, 1104*a*, and 1104*b* labeled) that are aligned with the stage scan direction, labeled y in FIG. 11 and a plurality of rows 1106 (one row, 1106*a* labeled) aligned with the annealing image sweep direction, labeled x in FIG. 11. Cross hatch shading is included in one column of the pixels to illustrate an example of varying grey levels of the pixels along a given column 1104.

Figures 12, 13:
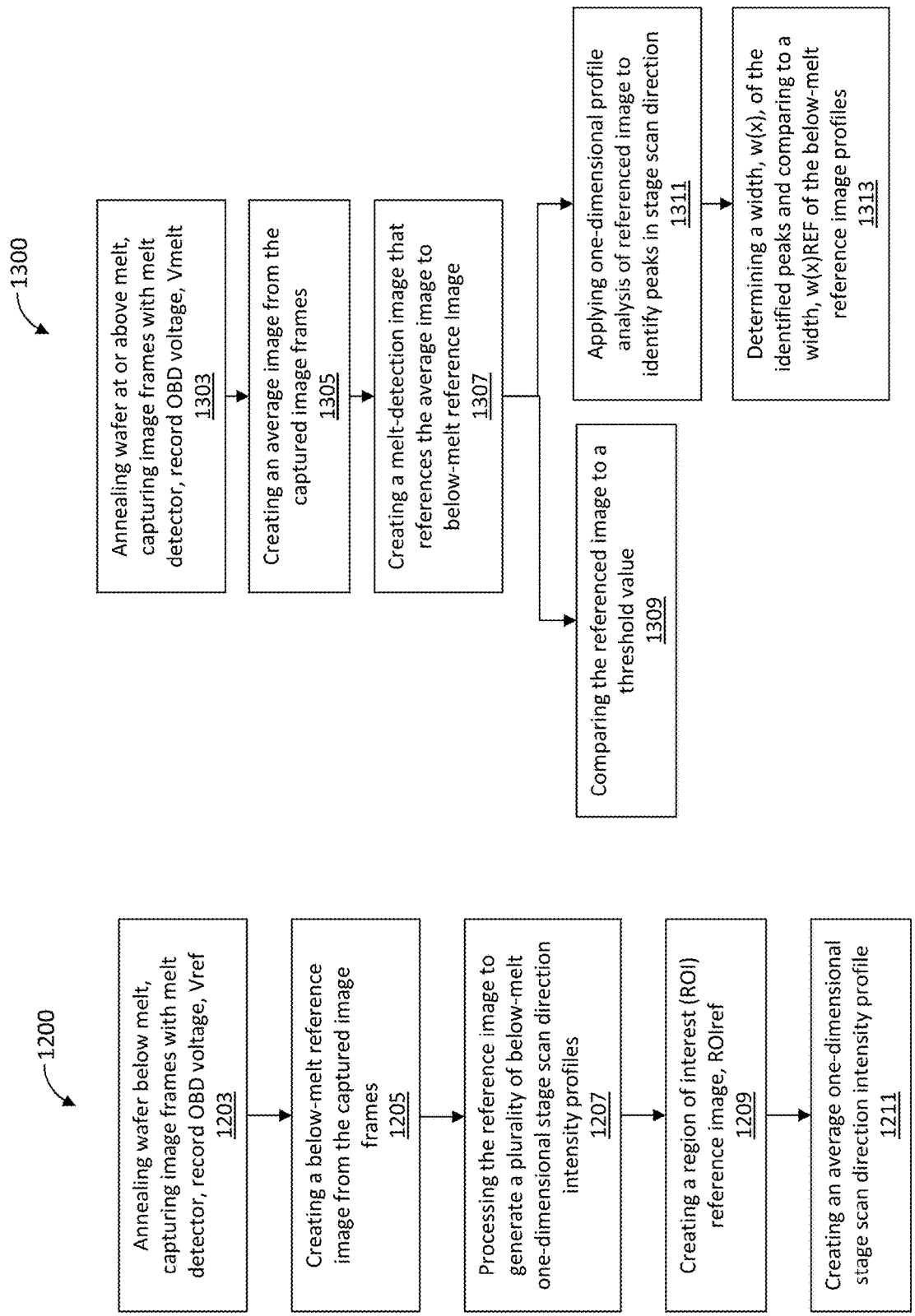
FIG. 12 illustrates an example method of generating below-melt reference images and associated parameters for use by one or more melt-detection algorithms.
FIG. 13 illustrates one example method of a melt detection algorithm, wherein melt is detected from a non-linearity of amplitudes in an image frame.
Figure 14:
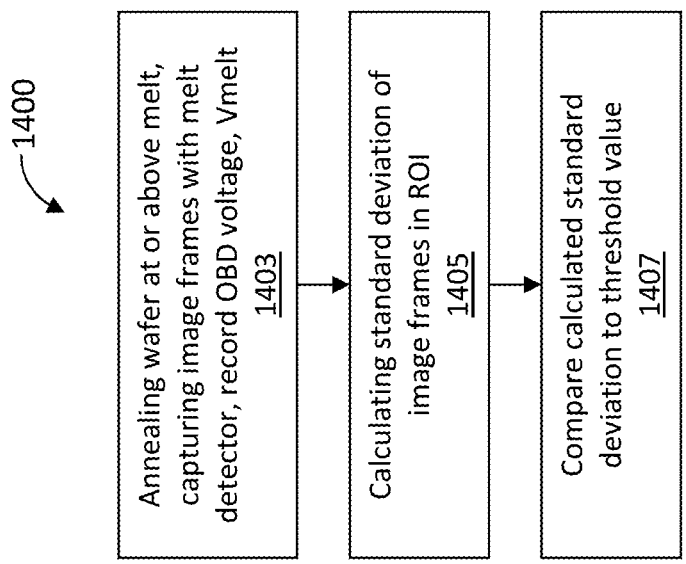
FIG. 14 illustrates one example method of a melt detection algorithm, wherein melt is detected from statistical variations in the melt image.

FIGS. 12-14 illustrate examples of melt detection algorithms that an image processing application, such as image processing application 1032 (FIG. 10) may be configured to perform. FIG. 12 illustrates an example method 1200 of generating below-melt reference images and associated parameters. At block 1203, method 1200 may include annealing a wafer below melt, capturing image frames with a scatter melt detector, and recording an annealing laser power level. In an example laser power can be measured with an on-board detector (OBD) that generates a voltage, $V_{ref}$, that corresponds to an optical power density of an annealing laser beam, such as annealing laser beam 268. In other examples, any other sensor technology or technique for monitoring laser power may be used. Block 1203 may also include receiving wafer type information, such as a unique identification number corresponding to a particular wafer design. In block 1203, image frames such as image frame 1100 (FIG. 11) are captured. Thus, block 1203 includes performing an annealing process at an annealing laser power level that is below a power level that will melt the wafer material in order to collect below-melt image data with a scatter melt detector such as scatter melt detector 280 that can be used as a reference against data during a melt process to detect melt.

In block 1205, method 1200 may include creating a below-melt reference image/ref from the captured image frames, which may include averaging the pixel values of a plurality of image frames, excluding any images that include an edge of the wafer in the image. At block 1207, processing the below-melt reference image to generate a plurality of below-melt one-dimensional stage scan direction intensity profiles. Block 1207 may include running a one-dimensional peak-detecting algorithm or fitting algorithm on one or more columns 1104 of pixels in the stage scan direction and generating parameters, such as amplitude, $A_{ref}(x)$, width, $w_{ref}(x)$, and center of gravity or maxima location, $y_{0,ref}(x)$, for each one-dimensional intensity profile, where, in an example, width, $w_{ref}(x)$ is a ±y distance from $y_{0,ref}(x)$ and a full width is $2 \cdot w_{ref}(x)$. Here, y refers to the stage scan direction and x refers to the or sweep direction (see FIG. 11). Block 1207, therefore, returns a profile of intensity of each column 1104 or group of columns along the y direction. Block 1207 may also include saving the plurality of profiles as sweep profiles.

In block 1209, a region of interest (ROI) of the below-melt reference image, referred to here as ROIref, can be identified that corresponds to a spatial location of the illumination line 272 in the image. ROIref may be determined by identifying pixels with an intensity above a minimum value that are located within the sweep profiles. In an example, $ROI_{ref}$ is determined from the sweep profile parameters determined in block 1207, for example, pixels in the reference image with an amplitude that is greater than a black level plus a number of grey levels corresponding to background outside of the annealing image, e.g. two grey levels on a scale of 255 grey levels of the FPA, and having a y location that is located within $y=y_{0,ref}(x) \pm 2 \cdot w_{ref}(x)$. At block 1211, method 1200 may include creating an average one-dimensional stage scan direction intensity profile, for example, by summing the grey values of pixels within ROIref in each row 1106 and dividing by the number of columns 1104 (see FIG. 11).

FIG. 13 illustrates one example method 1300 of a melt detection algorithm, wherein melt is detected from a non-linearity of amplitudes in an image frame. At block 1303, method 1300 may include annealing a wafer below, at, or above a melt threshold, capturing image frames with a scatter melt detector, and recording the corresponding OBD voltages, referred to here as $V_{melt}$, that indicate a power level of the annealing laser beam when the images were captured. Block 1303 may also include receiving wafer information, such as a unique ID, so that the appropriate below melt reference data obtained in method 1200 can be referenced. At block 1305, method 1300 may include creating an averaged image from the captured image frames by averaging all of the image frames of sweeps performed at the same laser power level, excluding any frames that include an edge of the wafer, and saving the averaged image. At block 1307, a melt-detection image $I_{data}$ is generated that references the average image created in block 1305 to a corresponding below-melt reference image for the same wafer type. In an example, the pixel values of the average image from block 1305 and corresponding laser power values can be referenced to the pixel values in the below-melt reference image generated at block 1205 of FIG. 12 and corresponding laser powers as follows:

$$\frac{I_{data}}{I_{ref}} \times \frac{V_{ref}}{V_{melt}}$$

where $I_{data}$ are the pixel values of the average image generated at block 1207, $I_{ref}$ are the pixel values of the below-melt reference image and $V_{ref}$ and $V_{melt}$ are the corresponding OBD signal values. In block 1309 the melt image values can be compared to a threshold value, e.g., 1.1, to determine if any melting occurred in the image. For example, the pixel values within ROIref in the melt image can be averaged and compared to a threshold value.

In addition or instead of performing block 1309, at block 1311, the method may include applying a one-dimensional profile analysis of the melt-detection image generated at block 1307 to identify narrow peaks in stage scan direction that have a width that is less than a width of the laser beam. At block 1313, determining a width, w(x), of the identified peaks and comparing to a width, w(x) of the below-melt reference image. If the identified peaks have a width that is smaller, e.g., less than 50% of the width of the below-melt reference image, $w_{ref}(x)$, melt is determined to have occurred. The foregoing is based on an energy profile of the laser beam and assumes a gaussian profile in the stage scan direction, y, that results in melt only occurring in a narrow region of the larger annealing image 270. Thus, a detected peak in intensity with a width in the stage scan direction (orthogonal to the sweep direction) that is less than a width of the annealing image in the stage scan direction indicates a localized melt region or melt pool within the annealing image. By way of example, referring to FIG. 11, pixels 1102a-1102e along column 1104 include cross hatching indicating differing amplitudes of the melt-detection image created at block 1307. For example, method 1300 may determine melt has occurred if pixel 1102c or 1102b-1102d have an amplitude that is greater than an amplitude of surrounding pixels and, e.g., above a threshold value, and a width of pixels 1102b-1102c in the stage scan direction y is sufficiently narrow as compared to a width of annealing illumination line 272 or corresponding $ROI_{ref}$. Steps 1311 and 1313 may be most useful for processed wafer with high scatter and can be achieved with a scatter melt detector with high resolution optics.

FIG. 14 illustrates another example algorithm for detecting melt, method 1400, according to melt statistics. In block 1403, method 1400 may include annealing a wafer below, at or above a melt threshold, capturing image frames with a scatter melt detector, and recording OBD voltage signal, $V_{melt}$. At block 1405, calculating a standard deviation of pixel values within $ROI_{ref}$ (determined at step 1209) of image frames. In an example, block 1405 may include calculating a fractional standard deviation that is a standard deviation of a ratio of pixel values within $ROI_{ref}$ to an average of the pixel values within $ROI_{ref}$. A large standard deviation indicates wide variability in intensity values within the $ROI_{ref}$, indicating the laser power was set at the melt threshold where there is large variability in pixels that are above and below melt, such as in the example shown in FIG. 9B. At block 1407, the calculated standard deviation is compared to a threshold value to determine the presence of melt. Method 1400 may be most useful for wafers with minimal scatter, such as bare Si wafers.

Methods 1200, 1300, and 1400 may be selectively used according to the particular wafer type and application as a melt-detection subroutine for a laser annealing process, including to calibrate a laser system and for determining laser power calibration tables or curves for a particular combination of process conditions, including wafer type, chuck temperature, and dwell time. Parameters and reference data, such as $V_{ref}$, $ROI_{ref}$, $V_{melt}$, below-melt one-dimensional stage scan direction intensity profiles, etc. may be stored in memory, such as in storage device 1016 and accessible by image processing application 1032 for performing any of the image processing algorithms disclosed herein.

Computing device 1000, with annealing laser control application 1034 may be configured to control one or more parameters of pre-heat and/or annealing laser systems 150, 250 to achieve a desired process condition at or above a melt threshold. Annealing laser control application 1034 may also be configured to control a power level of annealing laser system 250 according to annealing laser melt calibration setpoints 1024. Annealing laser melt calibration setpoints 1024 may specify laser power level setpoints for achieving a sub-melt, melt threshold, or beyond melt threshold annealing condition for a particular set of process conditions, such as for a particular chuck heater temperature, dwell time of the annealing image, and type of wafer 10. As described herein, scatter melt detector 280 may be utilized to perform a melt calibration for the annealing laser system 250 to determine the annealing laser melt calibration setpoints 1024.

In an example, ICD 406 may have a maximum exposure frequency that is less than a sweep frequency of the annealing image/sweep. A FOV of scatter melt detector 280 may include at least one annealing illumination line 272 (i.e. at least one sweep of the annealing image) and in some cases multiple annealing illumination lines (multiple consecutive sweeps of the annealing image). Thus, a single image captured by one exposure of ICD 406 may contain at least one and in some examples multiple sweeps of annealing image 270. Image processing application 1032 may utilize predetermined information on a known intensity profile of a material phase transition and extract one or more statistical correlation functions from the captured intensity of multiple sweeps from one or more image frames to characterize a melt process's consistency, or to act as multi-sampler on device wafers, or to act as a spatial lock-in frequency to simplify melt detection with fast fourier transforms.

In examples where scatter melt detectors of the present disclosure include a probe that is separate from the process laser, e.g. probe light source 410 (FIG. 4B), applications 1020 may also include a probe control application 1036 for controlling an intensity, phase and/or frequency of pulsed radiation emitted by probe light source 410 and/or a pulse timing of radiation emitted by the probe and/or a sensor exposure timing such as exposure timing of ICD 406, of varying length or period. Probe control application 1036 may include instructions for synchronizing the probe and ICD with sweep frequency, $f_{sweep}$, through a common clock, and determining a pulse frequency, $f_{Probe}$, and pulse phase $\phi_{probe}$ for probe 410 and ICD exposure, $f_{exposure}$, as a function of the sweep frequency, sweep phase, and the aspect of the wafer material phase transition process to be measured. In one example, $f_{probe}$ and $f_{exposure} \ll f_{sweep}$ so that $n_{probes}$, per ICD exposure is 1. In one example, a frequency ratio, $R=f_{weep}/f_{Probe}$, may be any integer, so that statistics on the stability of the phase transition process may be extracted. In one example, there may be no $f_{Probe}$, but rather a random distribution of pulses at known times may be collected for extraction of broadband statistics. In some examples, $f_{Probe}$ may be a rational beat frequency with $f_{sweep}$ to determine and optimize sweep uniformity. In one example, the probe pulse frequency, $f_{Probe}$, is selected such that $f_{Probe}$ is synchronized with the sweeps of the annealing image 270 in the x-direction, such a subset of synchronized moments in a set of annealing image sweeps will be probed with individual pulses, with the multiple pulses collected into a single image frame by ICD 406, so that the phase transition's high-bandwidth consistency may be extracted from the melt region's contrast. In some examples, probe 410 is configured to emit pulses of light having a duration of 3 ns-20 ns, and in some examples, 5 ns-15 ns, and in some examples, 5 ns-10 ns, and in some examples, 5 ns-7 ns.

Memory 1006 may hold instructions and data used by the processor 1002. Network adapter 1008 couples the computing device 1000 to a local or wide area network and communication modules 1010 provide additional channels for wired or wireless communication. As is known in the art, computing device 1000 can have different and/or other components than those shown in FIG. 10. In addition, computing device 1000 can lack certain illustrated components. In some examples the storage device 1016 can be local and/or remote from computing device 1000, such as a separate storage device, cold storage device, a storage area network (SAN), or a cloud-based storage architecture.

As is known in the art, computing device 1000 is adapted to execute computer program modules for providing functionality described herein. As used herein, the term module refers to computer program logic utilized to provide the specified functionality. Thus, a module can be implemented in hardware, firmware, and/or software. In one embodiment, program modules are stored on the storage device 1016, loaded into the memory 1006, and executed by the processor 1002.

Some portions of the present disclosure describe examples in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

While FIG. 10 illustrates a single computing device 1000 and storage device 1016, it will be understood that the functionality and storage provided by the computing device 1000 and storage device 1016 may be implemented in any number of computing devices and storage devices. By way of example, a first computing device 1000 may be used to implement controller 300 and one or more other computing devices 1000 may be used to execute other functionality disclosed herein such as stage controller 124, chuck heater, melt detector 280, etc.

Computing device 1000 may be configured to communicate with other computing devices of system 100 over one or more networks which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). Those skilled in the art will recognize that encryption using other suitable techniques will be appropriate for various applications based on the nature of the network.

Examples of the present disclosure include a method of analyzing scatter image data. The method includes receiving a scatter image of a region of a semiconductor surface captured during a laser annealing process of the semiconductor; and identifying a solid to liquid material phase transition of the semiconductor material from the image; wherein the identifying includes an identification of a statistical, time-series, or geometric non-linear variation of image intensity as a function of one or more annealing process control parameters. In some examples the one or more annealing process control parameters include laser power or optical power density.

Examples of the present disclosure also include a method of performing a melt calibration for a laser annealing process for a semiconductor material. The method includes annealing a region of the semiconductor material with an annealing laser beam from an annealing laser, wherein the annealing includes incrementally varying a power level of the annealing laser below and above a melt threshold power level where a solid to liquid phase transition of the semiconductor material occurs; capturing scatter images of the region of the semiconductor material during the annealing; and determining at least one melt threshold setpoint power level for the annealing laser from the captured scatter images.

Examples of the present disclosure include a method for controlling an annealing laser operating parameter during a laser annealing process. The method includes controlling an operating parameter of an annealing laser during an annealing process of a semiconductor material according to a laser annealing temperature calibration that was created by performing the method described in the preceding paragraph.

Examples of the present disclosure also include machine-readable instructions configured to cause a processor of a controller of a laser annealing system to control an annealing laser according to an annealing process parameter and at least one annealing laser melt threshold calibration setpoint determined according to the methods disclosed herein.

Examples of the present disclosure include a method of forming below-melt reference images and parameters for use with a melt-detection algorithm. The method includes annealing a wafer below melt; capturing image frames with a scatter melt detector; recording an annealing laser power level; creating a below-melt reference image from the captured image frames; processing the below-melt reference image to generate a plurality of below-melt one-dimensional stage scan direction intensity profiles; identifying a region of interest ($ROI_{ref}$) of the below-melt reference image; and creating an average one-dimensional stage scan direction intensity profile.

Examples of the present disclosure include a method of detecting whether a wafer material melted during an annealing process. The method includes annealing a wafer below, at, or above a melt threshold, capturing image frames with a scatter melt detector during the annealing, and recording the laser power levels; creating an averaged image from the captured image frames; and creating a melt-detection image that references the averaged image to a corresponding below-melt reference image for the same wafer type.

The method of forming below-melt reference images and parameters for use with a melt-detection algorithm as stated two paragraphs above, further comprising comparing values of the melt-detection image to a threshold value to determine whether melting occurred in one or more regions of the image.

The method of forming below-melt reference images and parameters for use with a melt-detection algorithm as stated three paragraphs above, further comprising applying a one-dimensional profile analysis of the melt-detection image to identify narrow peaks in a stage scan direction that have a width that is less than a width of the process laser beam.

The method of forming below-melt reference images and parameters for use with a melt-detection algorithm as stated four paragraphs above, wherein the below-melt reference image was obtained by performing any of the methods utilizing any of the systems disclosed herein.

Examples of the present disclosure also include a method of detecting whether a wafer material melted during an annealing process. The method includes annealing a wafer below, at, or above a melt threshold, and capturing image frames during the annealing with a scatter melt detector; calculating a statistical variation of pixel values within a region of interest, $ROI_{ref}$, of the image frames, wherein $ROI_{ref}$ is a region of the image where an annealing laser image was formed on the wafer; and comparing the calculated statistical variation to identify the onset of melt.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A method of determining the occurrence of a solid to liquid material phase transition of a semiconductor material during a laser annealing process, the method comprising:
   forming an annealing image on a surface of the semiconductor material with an annealing laser beam from an annealing laser;
   forming a scatter image of a region of the semiconductor surface that includes the annealing image; and
   identifying a solid to liquid material phase transition of the semiconductor material according to an intensity of light collected in the scatter image.

2. The method of claim 1, wherein the identifying includes the detection of an intensity in the scatter image that meets or exceeds a threshold value, the threshold value corresponding to the onset of the solid to liquid phase transition of the semiconductor material.

3. The method of claim 2, wherein the identifying includes the detection of a intensity in the scatter image in an area of the scatter image that is within the annealing image and smaller than an area of the annealing image.

4. The method of claim 1, wherein the identifying includes identifying a discontinuity in the intensity of light collected in the scatter image as compared to a below-melt reference image.

5. The method of claim 1, wherein the identifying includes identifying a non-linear scaling relationship between the intensity of light and a process parameter.

6. The method of claim 5, wherein the process parameter is a power level of the annealing laser or a local power-density of the annealing laser.

7. The method of claim 1, wherein the laser annealing process includes performing sequential sweeps of the annealing image across the semiconductor surface, wherein each sweep forms an annealing illumination line, wherein forming a scatter image includes forming an image of at least one annealing illumination line.

8. The method of claim 7, wherein the step of identifying includes analyzing an intensity of light along the annealing illumination line to determine the extent of a material phase transition of the semiconductor material along the annealing illumination line.

9. The method of claim 7, wherein the step of identifying includes analyzing an intensity of light along the annealing illumination line to determine a proportion of the annealing illumination line where an onset of the solid to liquid phase transition has occurred.

10. The method of claim 7, wherein the step of identifying includes analyzing an intensity of light at a first location along the annealing illumination line in a plurality of the sequential sweeps of the annealing image to determine at least one of a melt threshold power level or a statistical power fluctuation of the annealing laser.

11. The method of claim 1, wherein the laser annealing process includes performing sequential sweeps across the semiconductor surface at a sweep frequency, fsweep, the method further comprising irradiating the semiconductor surface with a probe light source with pulses of radiation at a pulse frequency, fProbe, wherein fProbe<fsweep.

12. The method of claim 1, wherein the identifying includes application of one or more of fitting algorithms, edge detection algorithms, eigenbasis decompositions, feed-forward classifiers, or the detection of any intensity in a captured image frame that exceeds a threshold value.

13. The method of claim 1, wherein the identifying includes:
   creating a melt-detection image that references the scatter image to a corresponding below-melt reference image.

14. The method of claim 13, further comprising comparing values of the melt-detection image to a threshold value to determine whether melting occurred in one or more regions of the melt-detection image.

15. The method of claim 13, further comprising applying a one-dimensional profile analysis of the melt-detection image to identify narrow peaks in a stage scan direction that have a width that is less than a width of the annealing laser beam.

16. The method of claim 13, wherein the below-melt reference image was obtained by performing steps comprising:
   annealing a wafer below melt;
   capturing image frames with a scatter melt detector;

recording an annealing laser power level;
creating a below-melt reference image from the captured image frames;
processing the below-melt reference image to generate a plurality of below-melt one-dimensional stage scan direction intensity profiles;
identifying a region of interest (ROIref) of the below-melt reference image; and
creating an average one-dimensional stage scan direction intensity profile.

17. The method of claim 1, wherein the identifying includes:
calculating a statistical variation of pixel values within a region of interest, ROIref, of a captured image frame, wherein ROIref is a region of the image where the annealing image was formed on the surface of the semiconductor material; and
comparing the calculated statistical variation to identify the onset of melt.

18. A scatter melt detection system, comprising:
a stage configured to support a semiconductor wafer;
an annealing laser configured to anneal the semiconductor wafer; and
a scatter melt detector that includes:
an image capture device that includes a focal plane array (FPA); and
a scatter optical arrangement configured to block or avoid a specular reflection of a beam formed by the annealing laser and form a scatter image of a surface of the semiconductor wafer on the FPA.

19. The system of claim 18, further comprising a processor and a machine readable storage media containing program instructions for execution by the processor for performing the steps including:
forming an annealing image on a surface of the semiconductor wafer with an annealing laser beam from an annealing laser;
forming a scatter image of a region of the semiconductor wafer surface that includes the annealing image; and
identifying a solid to liquid material phase transition of the semiconductor wafer according to an intensity of light collected in the scatter image.

20. A laser annealing system, comprising:
an annealing laser;
a storage device containing at least one annealing laser melt threshold calibration setpoint that specifies an operating parameter of the annealing laser to raise a temperature of a local region of a semiconductor material to a melt threshold under a set of predetermined annealing process conditions, wherein the calibration setpoint was derived from scatter images of the semiconductor material taken during a laser annealing process of the semiconductor material; and
a controller configured to control the annealing laser according to the annealing laser melt threshold calibration setpoint.

21. The system of claim 20, wherein the calibration setpoint was determined by a process that that includes:
forming an annealing image on a surface of the semiconductor material with an annealing laser beam from an annealing laser;
forming a scatter image of a region of the semiconductor surface that includes the annealing image; and
identifying a solid to liquid material phase transition of the semiconductor material according to an intensity of light collected in the scatter image.

\* \* \* \* \*